US010785724B1

(12) United States Patent
Luna et al.

(10) Patent No.: US 10,785,724 B1
(45) Date of Patent: *Sep. 22, 2020

(54) OPTIMIZING MOBILE NETWORK TRAFFIC COORDINATION ACROSS MULTIPLE APPLICATIONS RUNNING ON A MOBILE DEVICE

(71) Applicant: Seven Networks, LLC, Marshall, TX (US)

(72) Inventors: Michael Luna, San Jose, CA (US); Ari Backholm, Los Altos, CA (US)

(73) Assignee: Seven Networks, LLC, Marshall, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,357

(22) Filed: Jun. 16, 2020

Related U.S. Application Data

(60) Continuation of application No. 16/585,013, filed on Sep. 27, 2019, which is a continuation of application
(Continued)

(51) Int. Cl.
*H04W 52/02* (2009.01)
*H04L 12/12* (2006.01)
(Continued)

(52) U.S. Cl.
CPC ...... *H04W 52/0261* (2013.01); *G06F 1/3231* (2013.01); *G06F 1/3278* (2013.01); *G06F 1/3287* (2013.01); *G06F 16/9574* (2019.01); *H04L 12/12* (2013.01); *H04L 67/22* (2013.01); *H04W 52/00* (2013.01); *H04W 52/02* (2013.01); *H04W 52/0219* (2013.01); *H04W 52/0222* (2013.01); *H04W 52/0229* (2013.01);
(Continued)

(58) Field of Classification Search
CPC ....... H04L 67/04; H04L 67/145; H04L 67/28; H04L 67/2833; H04L 67/2842; H04L 67/288; H04L 67/289; H04L 67/32; H04W 12/06; H04W 52/0209; H04W 72/1221; H04W 74/06; H04W 76/02
See application file for complete search history.

(56) References Cited

U.S. PATENT DOCUMENTS 6,697,953 B1 2/2004 Collins
7,240,228 B2 7/2007 Bear et al.
(Continued)

FOREIGN PATENT DOCUMENTS

WO 2003100581 12/2003
WO 2009070415 A1 6/2009

OTHER PUBLICATIONS

Huang, U.S. Appl. No. 61/295,771, filed Jan. 18, 2010.
(Continued)

*Primary Examiner* — Mewale A Ambaye
(74) *Attorney, Agent, or Firm* — NK Patent Law

(57) ABSTRACT

A mobile device allows transmission of additional outgoing application data requests in response to occurrence of receipt of data transfer from a remote entity, user input in response to a prompt displayed to the user, and a change in a background status of an application executing on the mobile device. Additional outgoing application data requests are foreground application requests.

7 Claims, 29 Drawing Sheets

Related U.S. Application Data

No. 16/503,952, filed on Jul. 5, 2019, now Pat. No. 10,499,339, which is a continuation of application No. 16/164,601, filed on Oct. 18, 2018, now Pat. No. 10,477,481, which is a continuation of application No. 16/046,960, filed on Jul. 26, 2018, now Pat. No. 10,194,398, which is a continuation of application No. 15/595,104, filed on May 15, 2017, now Pat. No. 10,091,734, which is a continuation of application No. 14/710,167, filed on May 12, 2015, now Pat. No. 9,671,851, which is a continuation of application No. 14/467,922, filed on Aug. 25, 2014, now Pat. No. 9,247,019, and a continuation of application No. 13/477,625, filed on May 22, 2012, now abandoned, which is a division of application No. 13/407,406, filed on Feb. 28, 2012, now abandoned, said application No. 14/710,167 is a continuation of application No. 13/355,443, filed on Jan. 20, 2012, now Pat. No. 9,049,179, said application No. 14/467,922 is a division of application No. 13/188,553, filed on Jul. 22, 2011, now Pat. No. 8,886,176, said application No. 13/407,406 is a continuation of application No. 13/178,598, filed on Jul. 8, 2011, now abandoned, said application No. 14/710,167 is a continuation of application No. 13/115,740, filed on May 25, 2011, now abandoned, said application No. 13/355,443 is a continuation of application No. 13/115,631, filed on May 25, 2011, now Pat. No. 9,043,433.

(60) Provisional application No. 61/430,828, filed on Jan. 7, 2011, provisional application No. 61/416,033, filed on Nov. 22, 2010, provisional application No. 61/416,020, filed on Nov. 22, 2010, provisional application No. 61/408,829, filed on Nov. 1, 2010, provisional application No. 61/408,839, filed on Nov. 1, 2010, provisional application No. 61/408,846, filed on Nov. 1, 2010, provisional application No. 61/408,826, filed on Nov. 1, 2010, provisional application No. 61/408,854, filed on Nov. 1, 2010, provisional application No. 61/408,858, filed on Nov. 1, 2010, provisional application No. 61/408,820, filed on Nov. 1, 2010, provisional application No. 61/367,870, filed on Jul. 26, 2010, provisional application No. 61/367,871, filed on Jul. 26, 2010.

(51) Int. Cl.
| | | |
|---|---|---|
| *G06F 1/3231* | (2019.01) | |
| *G06F 1/3234* | (2019.01) | |
| *G06F 1/3287* | (2019.01) | |
| *H04L 29/08* | (2006.01) | |
| *H04W 52/00* | (2009.01) | |
| *G06F 16/957* | (2019.01) | |

(52) U.S. Cl.
CPC ... *H04W 52/0235* (2013.01); *H04W 52/0254* (2013.01); *H04W 52/0258* (2013.01); *Y02D 10/157* (2018.01); *Y02D 10/171* (2018.01); *Y02D 10/173* (2018.01); *Y02D 70/00* (2018.01); *Y02D 70/1222* (2018.01); *Y02D 70/1224* (2018.01); *Y02D 70/1242* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/23* (2018.01); *Y02D 70/26* (2018.01)

(56) References Cited

U.S. PATENT DOCUMENTS

| | | |
|---|---|---|
| 8,059,570 B2 | 11/2011 | Albert et al. |
| 8,078,896 B2 | 12/2011 | Karlsson |
| 8,185,165 B2 | 5/2012 | Beninghaus et al. |
| 8,255,716 B2 | 8/2012 | Mandyam |
| 8,280,456 B2 | 10/2012 | Hackborn et al. |
| 8,620,344 B2 | 12/2013 | Huang et al. |
| 8,627,123 B2 | 1/2014 | Jain et al. |
| 8,700,695 B2 | 4/2014 | Sundarrajan et al. |
| 8,904,206 B2 | 12/2014 | Black et al. |
| 9,210,529 B2 | 12/2015 | Huang et al. |
| 9,603,056 B2 | 3/2017 | Luna et al. |
| 9,671,851 B2 | 6/2017 | Luna et al. |
| 2005/0108075 A1 | 5/2005 | Douglis et al. |
| 2006/0200849 A1 | 9/2006 | Sundarrajan et al. |
| 2007/0038763 A1 | 2/2007 | Oestvall |
| 2007/0195074 A1 | 8/2007 | Gelissen |
| 2008/0133956 A1 | 6/2008 | Fadell |
| 2008/0242370 A1 | 10/2008 | Lando et al. |
| 2009/0032551 A1 | 2/2009 | McGinley et al. |
| 2009/0217065 A1 | 8/2009 | Araujo, Jr. |
| 2009/0228566 A1 | 9/2009 | Sharp et al. |
| 2009/0305732 A1 | 12/2009 | Marcellino et al. |
| 2009/0307696 A1 | 12/2009 | Vals et al. |
| 2010/0077035 A1 | 3/2010 | Li et al. |
| 2010/0088387 A1 | 4/2010 | Calamera |
| 2010/0246479 A1 | 9/2010 | Deu-Ngoc et al. |
| 2010/0274507 A1 | 10/2010 | Black et al. |
| 2010/0322124 A1 | 12/2010 | Luoma et al. |
| 2011/0080422 A1 | 4/2011 | Lee et al. |
| 2011/0153728 A1 | 6/2011 | Einarsson et al. |
| 2011/0177847 A1 | 7/2011 | Huang |
| 2011/0185202 A1 | 7/2011 | Black et al. |
| 2011/0249668 A1 | 10/2011 | Van Milligan et al. |
| 2012/0272230 A1 | 10/2012 | Lee |
| 2015/0241941 A1 | 8/2015 | Luna et al. |
| 2016/0048682 A1* | 2/2016 | Gou .................. G06F 21/56 726/22 |
| 2017/0205870 A1* | 7/2017 | Desai ................ G06F 1/3287 |

OTHER PUBLICATIONS

Google, Nexus One User's Guide, Mar. 15, 2010, available at https://theinformr.com/downloads/phones/manuals/htc-nexus-one-manual.pdf.

Renner, Karl, Petition for Inter Partes Review, Feb. 14, 2020, Minneapolis, MN.

File History of U.S. Pat. No. 10,292,072.

File History of U.S. Pat. No. 10,039,029.

Wicker, Stephen; Excerpts from Opening Expert Report of Stephen B. Wicker and Related Exhibits Regarding U.S. Pat. Nos. 10,039,029, 10,091,734, 9,438,550 9,516,127, 9,648,557—Redacted; Civil Action No. 2:19-cv-115-JRG; *Seven Networks, LLC* Plaintiff, v. *Apple Inc.* Defendant; Jun. 15, 2020.

Renner, Karl; Petition for Inter Partes Review of U.S. Pat. No. 10,091,734 and Associated Exhibits Pursuant to 35 U.S.C. §§ 311-319, 37 C.F.R. § 42; Dec. 27, 2019.

Easthom, Karl, Inter Partes Review for U.S. Pat. No. 10,091,734, Alexandria, VA.

* cited by examiner

OPTIMIZING MOBILE NETWORK TRAFFIC COORDINATION ACROSS MULTIPLE APPLICATIONS RUNNING ON A MOBILE DEVICE

CROSS-REFERENCE TO RELATED APPLICATIONS

This application is a continuation of U.S. patent application Ser. No. 16/585,013 filed Sep. 27, 2019, which is a continuation of U.S. patent application Ser. No. 16/503,952 filed Jul. 5, 2019, issued as U.S. Pat. No. 10,499,339 on Dec. 3, 2019, which is a continuation of U.S. patent application Ser. No. 16/164,601 filed Oct. 18, 2018, issued as U.S. Pat. No. 10,477,481 on Nov. 12, 2019, which is a continuation of U.S. patent application Ser. No. 16/046,960 filed Jul. 26, 2018, issued as U.S. Pat. No. 10,194,398 on Jan. 29, 2019, which is a continuation of U.S. patent application Ser. No. 15/595,104 filed May 15, 2017, issued as U.S. Pat. No. 10,091,734 on Oct. 2, 2018, which is a continuation of U.S. patent application Ser. No. 14/710,167 filed May 12, 2015, issued as U.S. Pat. No. 9,671,851 on Jun. 6, 2017, which is a continuation of U.S. patent application Ser. No. 13/477,625 filed May 22, 2012, which is a division of U.S. patent application Ser. No. 13/407,406 filed Feb. 28, 2012, which is a continuation of U.S. patent application Ser. No. 13/178,598 filed Jul. 8, 2011, which claims the benefit of U.S. Provisional Applications No. 61/430,828 filed Jan. 7, 2011, No. 61/416,033 filed Nov. 22, 2010, No. 61/416,020 filed Nov. 22, 2010, No. 61/408,846 filed Nov. 1, 2010, No. 61/408,854 filed Nov. 1, 2010, No. 61/408,858 filed Nov. 1, 2010, No. 61/408,829 filed Nov. 1, 2010, No. 61/408,826 filed Nov. 1, 2010, No. 61/408,820 filed Nov. 1, 2010, No. 61/408,839 filed Nov. 1, 2010, No. 61/367,870 filed Jul. 26, 2010, and No. 61/367,871 filed Jul. 26, 2010, each of which is incorporated herein by reference in its entirety.

U.S. patent application Ser. No. 14/710,167 filed May 12, 2015, issued as U.S. Pat. No. 9,671,851 on Jun. 6, 2017, is also a continuation of U.S. patent application Ser. No. 14/467,922 filed Aug. 25, 2014, issued as U.S. Pat. No. 9,247,019 on Jan. 26, 2016, which is a division of U.S. patent application Ser. No. 13/188,553 filed Jul. 22, 2011, issued as U.S. Pat. No. 8,886,176 on Nov. 11, 2014, which claims the benefit of U.S. Provisional Applications No. 61/430,828 filed Jan. 7, 2011, No. 61/416,033 filed Nov. 22, 2010, No. 61/416,020 filed Nov. 22, 2010, No. 61/408,846 filed Nov. 1, 2010, No. 61/408,854 filed Nov. 1, 2010, No. 61/408,858 filed Nov. 1, 2010, No. 61/408,829 filed Nov. 1, 2010, No. 61/408,826 filed Nov. 1, 2010, No. 61/408,820 filed Nov. 1, 2010, No. 61/408,839 filed Nov. 1, 2010, No. 61/367,870 filed Jul. 26, 2010, and No. 61/367,871 filed Jul. 26, 2010, each of which is incorporated herein by reference in its entirety.

U.S. patent application Ser. No. 14/710,167 filed May 12, 2015, issued as U.S. Pat. No. 9,671,851 on Jun. 6, 2017, is also a continuation of U.S. patent application Ser. No. 13/355,443 filed Jan. 20, 2012, issued as U.S. Pat. No. 9,049,179 on Jun. 2, 2015, which is a continuation of U.S. patent application Ser. No. 13/115,631 filed May 25, 2011, issued as U.S. Pat. No. 9,043,433 on May 26, 2015, which claims the benefit of U.S. Provisional Applications No. 61/430,828 filed Jan. 7, 2011, No. 61/416,033 filed Nov. 22, 2010, No. 61/416,020 filed Nov. 22, 2010, No. 61/408,846 filed Nov. 1, 2010, No. 61/408,854 filed Nov. 1, 2010, No. 61/408,858 filed Nov. 1, 2010, No. 61/408,829 filed Nov. 1, 2010, No. 61/408,826 filed Nov. 1, 2010, No. 61/408,820 filed Nov. 1, 2010, No. 61/408,839 filed Nov. 1, 2010, No. 61/367,870 filed Jul. 26, 2010, and No. 61/367,871 filed Jul. 26, 2010, each of which is incorporated herein by reference in its entirety.

U.S. patent application Ser. No. 14/710,167 filed May 12, 2015, issued as U.S. Pat. No. 9,671,851 on Jun. 6, 2017, is also a continuation of U.S. patent application Ser. No. 13/115,740 filed May 25, 2011, which claims the benefit of U.S. Provisional Applications No. 61/430,828 filed Jan. 7, 2011, No. 61/416,033 filed Nov. 22, 2010, No. 61/416,020 filed Nov. 22, 2010, No. 61/408,846 filed Nov. 1, 2010, No. 61/408,854 filed Nov. 1, 2010, No. 61/408,858 filed Nov. 1, 2010, No. 61/408,829 filed Nov. 1, 2010, No. 61/408,826 filed Nov. 1, 2010, No. 61/408,820 filed Nov. 1, 2010, No. 61/408,839 filed Nov. 1, 2010, No. 61/367,870 filed Jul. 26, 2010, and No. 61/367,871 filed Jul. 26, 2010, each of which is incorporated herein by reference in its entirety.

BACKGROUND

When WCDMA was specified, there was little attention to requirements posed by applications whose functions are based on actions initiated by the network, in contrast to functions initiated by the user or by the device. Such applications include, for example, push email, instant messaging, visual voicemail and voice and video telephony, and others. Such applications typically require an always-on IP connection and frequent transmit of small bits of data. WCDMA networks are designed and optimized for high-throughput of large amounts of data, not for applications that require frequent, but low-throughput and/or small amounts of data. Each transaction puts the mobile device radio in a high power mode for considerable length of time—typically between 15-30 seconds. As the high power mode can consume as much as 100× the power as an idle mode, these network-initiated applications quickly drain battery in WCDMA networks. The issue has been exacerbated by the rapid increase of popularity of applications with network-initiated functionalities, such as push email.

Lack of proper support has prompted a number of vendors to provide documents to guide their operator partners and independent software vendors to configure their networks and applications to perform better in WCDMA networks. This guidance focuses on: configuring networks to go to stay on high-power radio mode as short as possible and making periodic keep alive messages that are used to maintain an always-on TCP/IP connection as infrequent as possible. Such solutions typically assume lack of coordination between the user, the application and the network.

Furthermore, application protocols may provide long-lived connections that allow servers to push updated data to a mobile device without the need of the client to periodically re-establish the connection or to periodically query for changes. However, the mobile device needs to be sure that the connection remains usable by periodically sending some data, often called a keep-alive message, to the server and making sure the server is receiving this data. While the amount of data sent for a single keep-alive is not a lot and the keep-alive interval for an individual application is not too short, the cumulative effect of multiple applications performing this individually will amount to small pieces of data being sent very frequently. Frequently sending bursts of data in a wireless network also result in high battery consumption due to the constant need of powering/re-powering the radio module.

Furthermore, in general, mobile application usage is sporadic in nature. For example, there can be periods of user inactivity (e.g., during working hours or when the user is sleeping) followed by periods of multiple application usage, such as where a user is updating their Facebook status, sending a Tweet, checking their email, and using other applications to get an update of their online information. This doesn't mean, however, that the mobile device is inactive during user inactivity: the device may be actively downloading new content such as advertisements, polling for email, and receiving push notifications for activities on the Internet, thus utilizing occupying network bandwidth and consuming device power even when the user is not interacting with the mobile device or otherwise expecting data.

DETAILED DESCRIPTION

Figure 1A:
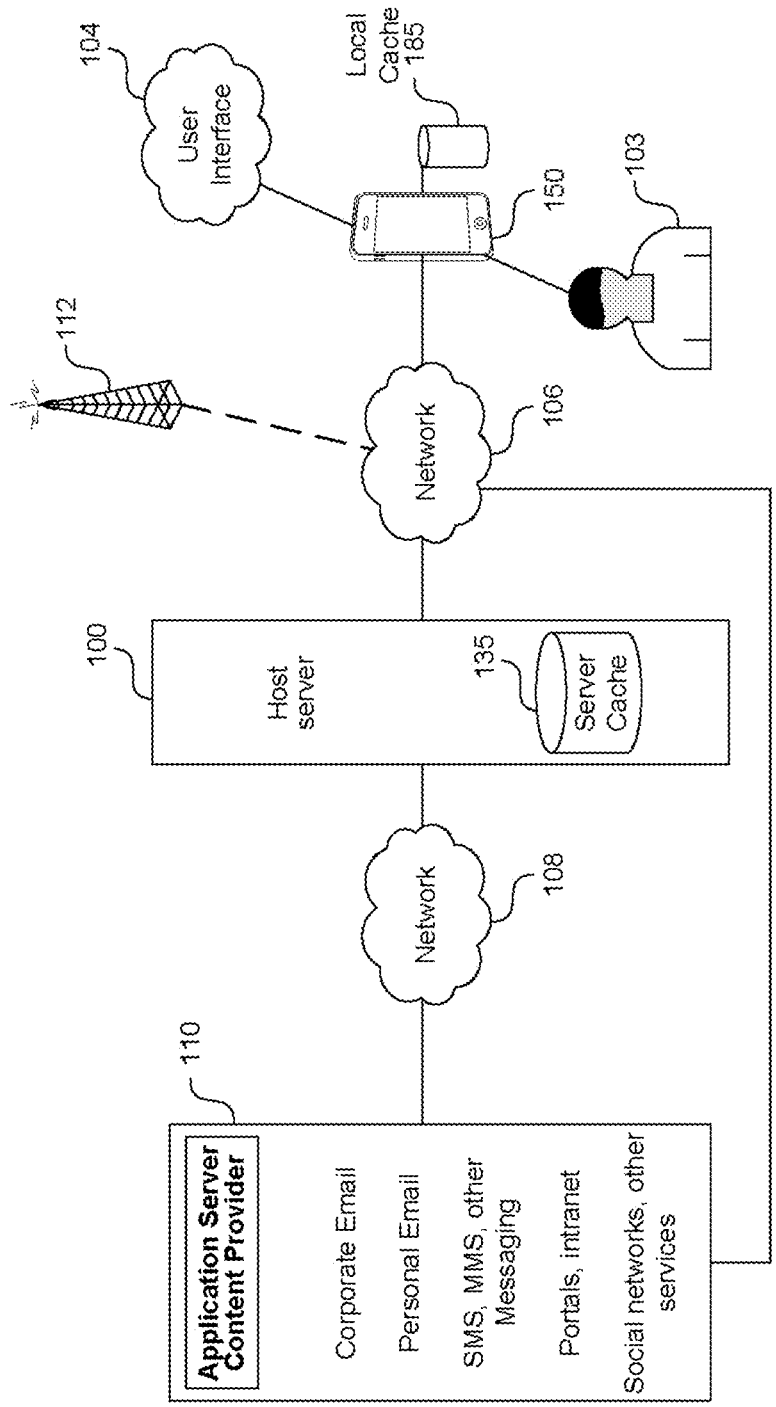
FIG. 1A illustrates an example diagram of a system where a host server facilitates management of traffic between client devices and an application server or content provider in a wireless network for resource conservation.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for mobile application traffic optimization.

Embodiments of the present disclosure include systems and methods for context aware traffic management for network and device resource conservation.

Embodiments of the present disclosure include systems and methods for mobile network traffic coordination across multiple applications.

Embodiments of the present disclosure include systems and methods for prediction of activity session for mobile network use optimization and/or user experience enhancement.

One embodiment of the disclosed technology includes, a system that optimizes multiple aspects of the connection with wired and wireless networks and devices through a comprehensive view of device and application activity including: loading, current application needs on a device, controlling the type of access (push vs. pull or hybrid), location, concentration of users in a single area, time of day, how often the user interacts with the application, content or device, and using this information to shape traffic to a cooperative client/server or simultaneously mobile devices without a cooperative client. Because the disclosed server is not tied to any specific network provider it has visibility into the network performance across all service providers. This enables optimizations to be applied to devices regardless of the operator or service provider, thereby enhancing the user experience and managing network utilization while roaming. Bandwidth has been considered a major issue in wireless networks today. More and more research has been done related to the need for additional bandwidth to solve access problems—many of the performance enhancing solutions and next generation standards, such as LTE, 4G, and WiMAX are focused on providing increased bandwidth. A key problem is lack of bandwidth on the signaling channel more so than the data channel.

Embodiments of the disclosed technology includes, for example, alignment of requests from multiple applications to minimize the need for several polling requests; leverage specific content types to determine how to proxy/manage a connection/content; and apply specific heuristics associated with device, user behavioral patterns (how often they interact with the device/application) and/or network parameters.

Embodiments of the present technology can further include, moving recurring HTTP polls performed by various widgets, RSS readers, etc., to remote network node (e.g., Network operation center (NOC)), thus considerably lowering device battery/power consumption, radio channel signaling, and bandwidth usage. Additionally, the offloading can be performed transparently so that existing applications do not need to be changed.

In some embodiments, this can be implemented using a local proxy on the mobile device which automatically detects recurring requests for the same content (RSS feed, Widget data set) that matches a specific rule (e.g., happens every 15 minutes). The local proxy can automatically cache the content on the mobile device while delegating the polling to the server (e.g., a proxy server operated as an element of a communications network). The server can then notify the mobile/client proxy if the content changes, and if content has not changed (or not changed sufficiently, or in an identified manner or amount) the mobile proxy provides the latest version in its cache to the user (without need to utilize the radio at all). This way the mobile device (e.g., a mobile phone, smart phone, etc.) does not need to open up (e.g., thus powering on the radio) or use a data connection if the request is for content that is monitored and that has been not flagged as new, changed, or otherwise different.

The logic for automatically adding content sources/application servers (e.g., including URLs/content) to be monitored can also check for various factors like how often the content is the same, how often the same request is made (is there a fixed interval/pattern?), which application is requesting the data, etc. Similar rules to decide between using the cache and request the data from the original source may also be implemented and executed by the local proxy and/or server.

For example, when the request comes at an unscheduled/unexpected time (user initiated check), or after every (n) consecutive times the response has been provided from the cache, etc., or if the application is running in the background vs. in a more interactive mode of the foreground. As more and more mobile applications base their features on resources available in the network, this becomes increasingly important. In addition, the disclosed technology allows elimination of unnecessary chatter from the network, benefiting the operators trying to optimize the wireless spectrum usage.

Cross Application Traffic Coordination

In one embodiment of the present disclosure, a group of applications [A, B, C . . . ] may have a timeline of transfers of data from the mobile device (or client (e.g., mobile application, software agent, widget, etc.) on the mobile device) to the network, or from the network to the mobile device (for receipt by the client). The time of the transfers can be represented as:

Application A: $tA1, tA2, tA3, \ldots$
Application B: $tB1, tB2, tB3, \ldots$
Application C: $tC1, tC2, tC3, \ldots$ Each of the times 't' can have a natural point of occurring based upon the independent activity of the corresponding application as operations are executed at the application server/provider and/or on the software client on the mobile device. For example, an application can transfer a message, an event, or other types of data to the network (or vice versa) at a regular or semi-regular series of times as part of polling, satisfying a device, application, or user request, application maintenance, or other operation.

Similarly, an application can transfer a message, event, or other types data via the network (or vice versa) at a regular, semi-regular, or irregular series of times to perform its inherent functions or operations, such as synchronizing two data stores, determining the contents of a data store, accessing new data from the application server/service provider, communicating with a peer device (e.g., another device with the same application or another application with which the requesting application interacts), exchanging control messages, etc.

In some instances, there is typically no correlation or weak correlation between the times at which data transfers or event transactions occur for one application as compared to a second application on a given mobile device, or for different data requests for the same application. In some cases, there may be a stronger correlation between the times at which a transfer occurs for one application as compared to a second application (e.g., where an operation of a first application is dependent upon or triggers an operation of a second application, or where a user typically executes an operation of one application in conjunction with an operation of a second application). Note that in some instances, the second application may be the same application as the first application and that correlations can be tracked and determined for multiple requests sent by one application in a similar fashion.

In some embodiments, in order to optimize (e.g., typically to minimize) the number of times that a device (e.g., a mobile device or smart phone) radio is turned on to decrease the consumption of power (and hence conserve its battery or other power source), a distributed proxy system including a local proxy and/or proxy server can operate to intercept the events or transactions (or requests for transfer) of information. When intercepted, the local proxy and/or the proxy server can delay (or expedite) the time at which one or more of these transfers would normally occur in order to perform multiple transfers together as part of a single transfer operation (i.e., instead of performing multiple, individual transfers). Alternatively, the local and/or proxy server can pre-retrieve data for a non-priority application or less important/time sensitive application whose polls are typically expected to happen before another application having higher priority, for example. In other words, a delay could be negative resulting in content pre-retrieval for alignment with an anticipated data request which typically happens before the request of the lesser priority application.

The delay time (D) can represent a maximum time delay value (or in some instances, expedited time value) after receipt of a request to make such a transfer, with the value of D determined so as to enable the collection of as many of the transfers as feasible in a single, optimized data transfer. The delay times or expedited times of one or more transfers are determined so as to factor in any potential impact on performance and user experience. Ideally, the system determines D to prevent undesired penalties or inefficiencies, and to prevent undesired impact on the user experience. Note that as described above, the delay 'D' could be negative or positive for alignment purposes (e.g., to implement a delayed or an expedited transfer).

In some embodiments, delay time 'D' (use to represent both positive and negative delays (effectively and expedited transfer)) can be determined based on consideration of one or more of the following factors: the priority of the application (or the relative priority of one application in comparison to another), the nature or amount of data involved in the transfer (e.g., whether it represents fresh data, a housekeeping function, a control instruction, etc.), the status of the application (e.g., active, inactive, background, foreground, etc.), a useable lifetime of the data to be transferred (a period before it becomes stale), the interval between the transfer times of multiple data requests for a single application, the interval between the transfer times across more than one application (e.g., the largest transfer time interval based on consideration of all active applications), network characteristics (available bandwidth, network latency, etc.), or another relevant factor.

In some embodiments, the delay time 'D' of specific events/transactions can be controlled by the mobile device (e.g., platform, device settings, or OS specifications), network service provider, and/or the user as part of optimizing the battery life to align data transfer requests across multiple applications or the same application, as opposed to performing each data transfer individually. In some instances, the user can manually configure a setting specifying that requests across multiple applications or the same application are to be batched. The user can enable the setting, and allow the system to configure the details. In addition, the user can specify preferences, priorities, or any other constraints related to alignment of data request transfer of the mobile network.

Activity Session Method

As will be described, in some embodiments the present disclosure is directed to a method for augmenting a distributed proxy-based solution by introducing the concept of an "activity session". An activity session is a pattern of multiple mobile application use by a user that can be "predicted" by using contextual clues available to a local proxy on a mobile device. Based on the prediction, a multiplex connection can be created and pre-caching of content can be performed to support the data activity during the session, thus minimizing the signaling overhead as well as the multiplexed transaction duration. In some embodiments this approach will also provide the additional benefit of an improved user experience (e.g., by reducing a perceived latency).

In one embodiment, an activity session is a pattern of multiple mobile application use by a mobile user that can be "predicted" (or otherwise anticipated or expected) based on contextual clues detected and analyzed by a local proxy on a device (e.g., the user's mobile or portable phone, smartphone) and/or by a proxy server in a distributed proxy system.

Based on the prediction, a multiplex connection can be created and pre-caching of content can be performed to support the data activity during the session, thus minimizing the signaling overhead as well as the multiplexed transaction duration. Further, in some embodiments this approach can provide enhanced user experience by reducing or eliminating user wait times or other sources of latency in the user experience.

Connection Optimization

TCP connections, such as persistent TCP sessions and TCP connection pooling can be utilized for reusing connections. Both techniques on a mobile device allow previously-established TCP connections to the same server (e.g., a host server, an application server, or content provider) to be reused for multiple HTTP transactions, which saves connection establishment and tear-down times between transactions. However, with multiple applications running, and each establishing its own TCP connections to multiple host servers (application servers/content providers), there are potentially many TCP connections being established on a mobile device during a given time of network activity.

A benefit of a distributed proxy system (such as that shown in the examples of FIGS. 1A-1B), where each component (i.e., the local proxy in the mobile device and the proxy server in the host server) is acknowledged by the system and each other, is that a single TCP connection can be used to transport all of the application traffic during an established activity session.

For example, the WebMUX and SCP protocols allow multiplexing of multiple sessions of application-level protocols (such as HTTP) over a single TCP connection. In one embodiment, an activity session can be supported by a multiplexed TCP connection using these or additional mechanisms. In another embodiment, the activity session is supported by a TCP connection pool, with the connection reuse enhanced by nature of connecting to a single and known proxy server such as the disclosed proxy system.

Prediction Basis

The disclosed distributed proxy and cache system can eliminate or decrease resource consumption of "background" data access of mobile applications and processes in order to improve signaling efficiency, power consumption (battery life), and use of network resources. The prioritization or prediction of the occurring of data access or the background data access may be based on one or more data types or characteristics, heuristics, algorithms, collaborative filtering techniques, etc. that process data to determine a most likely behavior by a user.

For example, the data processing may determine that there is a relatively high correlation between a user accessing one type of application, followed by them accessing a second application. Or, that when a user becomes active on their device after a certain amount of time, they are likely to engage in a series of actions, data requests, etc. Or, that when sufficient new data (notifications, messages, etc.) has become available to the user, they are likely to access it in a certain order (such as by activating a series of applications or generating a series of requests in a certain order).

In some embodiments, or in addition to the server prediction approach described above, the mobile device may use contextual cues available via hardware sensors or application activity indications to predict the likelihood of the start of an activity session. For example, the local proxy may monitor location changes in the device to predict that a location update may be sent to a location-based service, or may monitor user activity at certain geographical locations and anticipate an activity session, for example, based on historical application usage at a particular location. The anticipated activity session, which can be derived by means of hardware context on the mobile device (e.g., the state or operating status of the device), can be the same or different in structure as that created by the proxy server (e.g., server 100 of FIGS. 1A-1B).

Establishing the Activity Session

An activity session may be recognized and activated based on a predicted activity session by either the proxy server or the local proxy in the following manner. On the device side, application activity after a period of inactivity, during which a potential activity session has been identified, can cause the local proxy to compare the data request to a list of host URLs associated with a predicted/anticipated activity session.

If the data activity matches a higher-priority entry in the URL list, for example, based on a priority threshold, the data activity may trigger the start of an activity session based on the predicted activity session. If there is no match or a lower-priority match, then the activity session may not be initiated. Other embodiments may include other prioritization schemes or priority criteria to determine when or if an activity session will be established. A predicted activity session can be recognized and converted to an Activity Session in the host server (proxy server) in a similar manner.

In some embodiments, if an activity session is detected or created by the local proxy, the local proxy can request a multiplexed connection be established to optimize the signaling during the session. If an activity session is identified by the server, the existing TCP connection opened from the mobile device can be converted into a multiplexed session and used for the optimized connection. Alternatively, the first data request from the mobile device can be accomplished outside of the multiplexed connection, and the multiplexed connection can be established for subsequent data transfers.

Once an activity session is established and has been acknowledged by the local proxy and/or proxy server, the proxy server can now proactively cache data (e.g., access the URLs or application servers/providers anticipated in the predicted activity sessions) for more rapid access to content anticipated to be needed in the predicted activity session. The system can "piggy-back" transfer of the anticipated data with other data requested by the mobile device for caching in the local cache on the mobile device. These mechanisms effectively increase the availability of desired data on the mobile, and shorten the duration of an established connection needed for the present activity session.

One example of a use case for the present technology is described as follows:
  i. Predicting an activity session based on push activity in the idle state:
    1. While user is sleeping, his phone has received three push notifications from Facebook, and five emails;

2. When user wakes up and checks his phone, he sees these notifications and emails. His natural tendency is to open these two applications and check his emails and Facebook status;
3. Upon the transition from screen-lock to unlock, the server recognizes that based on the push activity, the user is likely to get access to these two applications. The device sends a state change notification to the server, and in response, the server sends an activity session indicator to the device. The server pre-caches information relevant to the session, and creates a persistent connection with the device to support the activity session;
4. User accesses the services, and is pleased that the relevant data seems to be already on his device;
5. The persistent connection is managed by the device and server to time out based on certain criteria, to maximize device battery life.

ii. Predicting an activity session based on a change in geographical location during idle state—as a user moves between locations, the system can recognize that they are more likely to engage in certain requests or activities based on the transit route or the new location.

iii. Predicting an activity session based on receiving a phone call in idle state based on previous user behavior, the system now recognizes that the user is likely to engage in certain behaviors upon accessing the call (such as checking a specific applications, making certain updates, accessing certain contacts in the contact book, etc.).

FIG. 1A illustrates an example diagram of a system where a host server 100 facilitates management of traffic between client devices 102 and an application server or content provider 110 in a wireless network for resource conservation.

The client devices 102A-D can be any system and/or device, and/or any combination of devices/systems that is able to establish a connection, including wired, wireless, cellular connections with another device, a server and/or other systems such as host server 100 and/or application server/content provider 110. Client devices 102 will typically include a display and/or other output functionalities to present information and data exchanged between among the devices 102 and/or the host server 100 and/or application server/content provider 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Palm device, Treo, a handheld tablet (e.g., an iPad or any other tablet), a hand held console, a hand held gaming device or console, any SuperPhone such as the iPhone, and/or any other portable, mobile, hand held devices, etc. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology in acquiring context awareness at the client device 102. Context awareness at client devices 102 generally includes, by way of example but not limitation, client device 102 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data. Network side contextual data can be received from and/or queried from network service providers (e.g., cell provider 112 and/or Internet service providers) of the network 106 and/or network 108 (e.g., by the host server and/or devices 102). In addition to application context awareness as determined from the client 102 side, the application context awareness may also be received from or obtained/queried from the respective application/service providers 110 (by the host 100 and/or client devices 102).

The host server 100 can use, for example, contextual information obtained for client devices 102, networks 106/108, applications (e.g., mobile applications), application server/provider 110, or any combination of the above, to manage the traffic in the system to satisfy data needs of the client devices 102 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 102 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 102 behaviors. The device 150 can also request the host server 100 to alter the behavior for network resource consumption based on user activity or behavior.

In one embodiment, the traffic management for resource conservation is performed using a distributed system between the host server 100 and client device 102. The distributed system can include proxy server and cache components on the server 100 side and on the client 102 side, for example, as shown by the server cache 135 on the server 100 side and the local cache 150 on the client 102 side.

Functions and techniques disclosed for context aware traffic management for resource conservation in networks (e.g., network 106 and/or 108) and devices 102, reside in a distributed proxy and cache system. The proxy and cache system can be distributed between, and reside on, a given client device 102 in part or in whole and/or host server 100 in part or in whole. The distributed proxy and cache system are illustrated with further reference to the example diagram shown in FIG. 1B. Functions and techniques performed by the proxy and cache components in the client device 102, the host server 100, and the related components therein are described, respectively, in detail with further reference to the examples of FIGS. 2A-3B.

In one embodiment, client devices 102 communicate with the host server 100 and/or the application server 110 over network 106, which can be a cellular network. To facilitate overall traffic management between devices 102 and various application servers/content providers 110 to implement network (bandwidth utilization) and device resource (e.g., battery consumption), the host server 100 can communicate with the application server/providers 110 over the network 108, which can include the Internet.

In general, the networks 106 and/or 108, over which the client devices 102, the host server 100, and/or application server 110 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, Open System Interconnections (OSI), FTP, UPnP, iSCSI, NSF, ISDN, PDH, RS-232, SDH, SONET, etc.

The networks 106 and/or 108 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMAX, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMAX, WiMAX 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 1B:
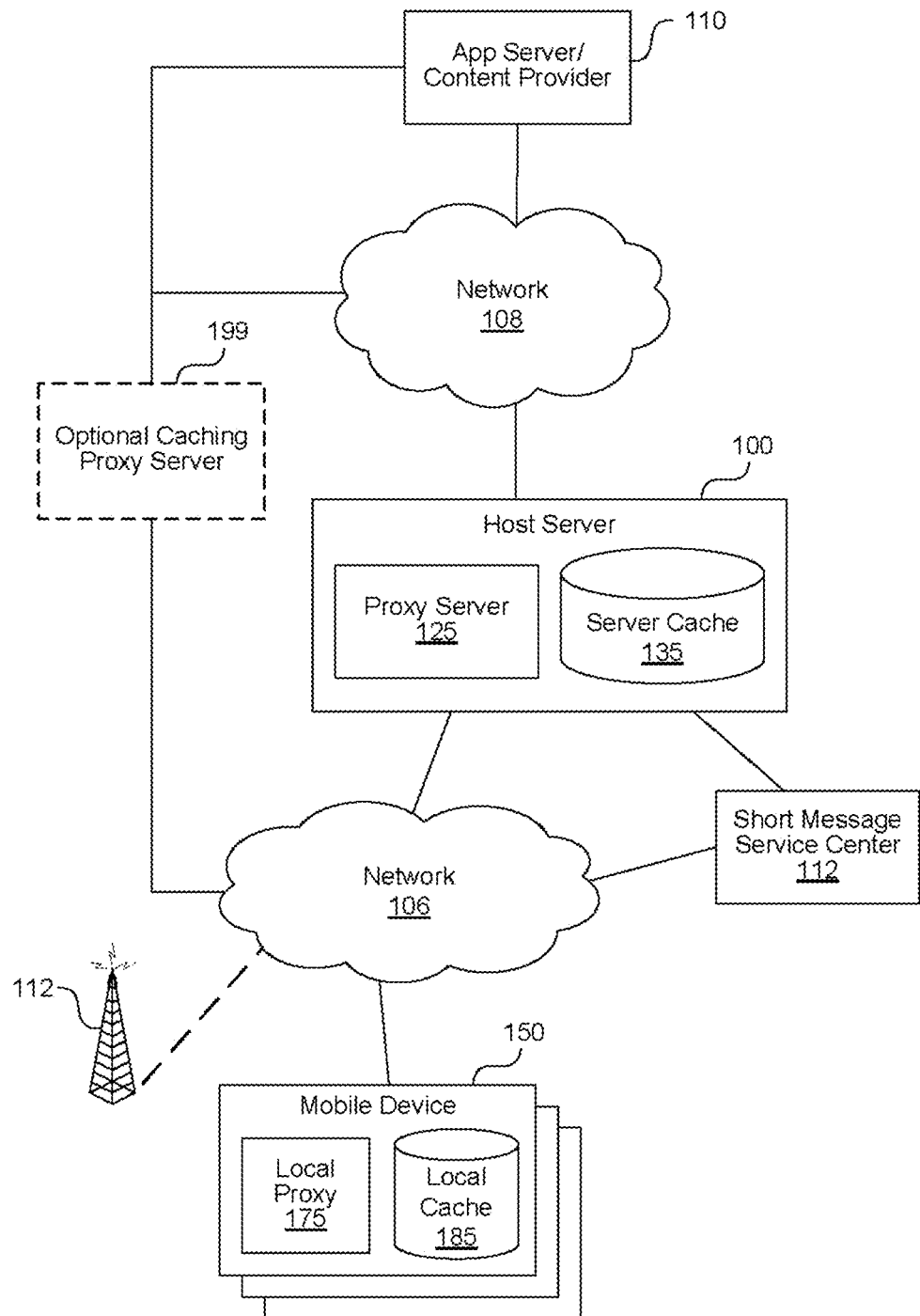
FIG. 1B illustrates an example diagram of a proxy and cache system distributed between the host server and device which facilitates network traffic management between a device and an application server/content provider for resource conservation.

FIG. 1B illustrates an example diagram of a proxy and cache system distributed between the host server 100 and device 150 which facilitates network traffic management between the device 150 and an application server/content provider 100 (e.g., a source server) for resource conservation.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties including, one or more of, battery level, network that the device is registered on, radio state, whether the mobile device is being used (e.g., interacted with by a user). In some instances, the local proxy 175 can delay, expedite (pre-fetch) and/or modify data prior to transmission to the proxy server 125, when appropriate, as will be further detailed with references to the description associated with the examples of FIGS. 2A-3B.

The local database 185 can be included in the local proxy 175 or coupled to the proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the app server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. For example, the local proxy may be implemented without adding a TCP stack and thus act transparently to both the US and the mobile applications. In some instances, the local proxy 175 is optionally customizable in part or in whole to be device specific. In some embodiments, the local proxy 175 may be bundled into a wireless model, into a firewall, and/or a router.

In one embodiment, the host server 100 can in some instances, utilize the store and forward functions of a short message service center (SMSC) 112, such as that provided by the network service provider 112, in communicating with the device 150 in achieving network traffic management. As will be further described with reference to the examples of FIG. 3A and/or FIG. 3B, the host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 2A:
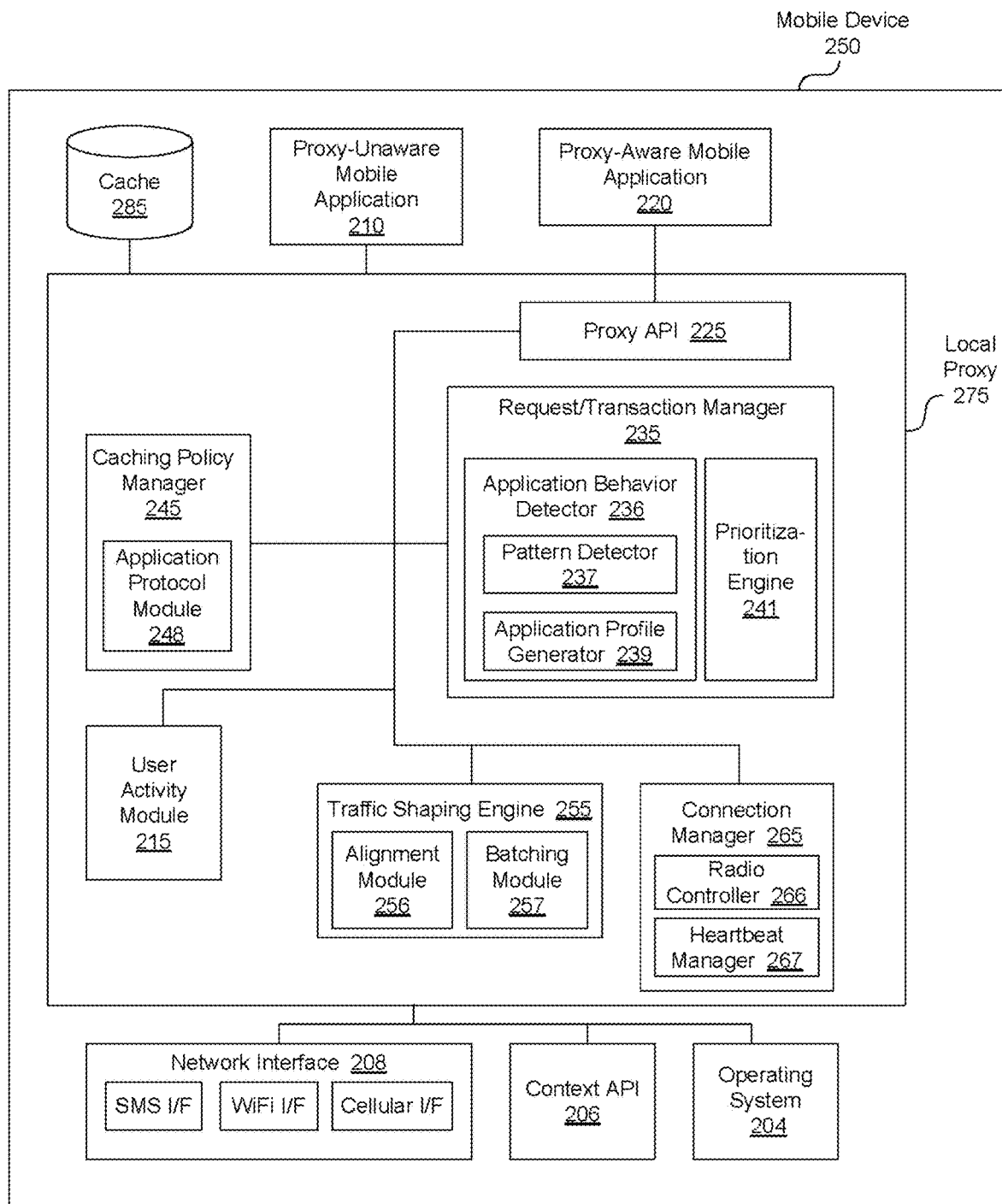
FIG. 2A depicts a block diagram illustrating an example of client-side components in a distributed proxy and cache system residing on a mobile device that manages traffic in a wireless network for resource conservation.

FIG. 2A depicts a block diagram illustrating an example of client-side components in a distributed proxy and cache system residing on a device 250 that manages traffic in a wireless network for resource conservation.

The device 250, which can be a portable or mobile device, such as a portable phone, generally includes, for example, a network interface 208, an operating system 204, a context API 206, and mobile applications which may be proxy unaware 210 or proxy aware 220. Note that the device 250 is specifically illustrated in the example of FIG. 2A as a mobile device, such is not a limitation and that device 250 may be any portable/mobile or non-portable device able to receive, transmit signals to satisfy data requests over a network including wired or wireless networks (e.g., Wi-Fi, cellular, Bluetooth, etc.).

The network interface 208 can be a networking module that enables the device 250 to mediate data in a network with an entity that is external to the host server 250, through any known and/or convenient communications protocol supported by the host and the external entity. The network interface 208 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

Device 250 can further include, client-side components of the distributed proxy and cache system which can include, a local proxy 275 (e.g., a mobile client of a mobile device) and a cache 285. In one embodiment, the local proxy 275 includes a user activity module 215, a proxy API 225, a request/transaction manager 235, a caching policy manager 245, a traffic shaping engine 255, and/or a connection manager 265. The traffic shaping engine 255 may further include an alignment module 256 and/or a batching module 257, the connection manager 265 may further include a radio controller 266. The request/transaction manager 235 can further include an application behavior detector 236 and/or a prioritization engine 241, the application behavior detector 236 may further include a pattern detector 237 and/or and application profile generator 239. Additional or less components/modules/engines can be included in the local proxy 275 and each illustrated component.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In one embodiment, a portion of the distributed proxy and cache system for network traffic management resides in or is in communication with device 250, including local proxy 275 (mobile client) and/or cache 285. The local proxy 275 can provide an interface on the device 250 for users to access device applications and services including email, IM, voice mail, visual voicemail, feeds, Internet, other applications, etc.

Figure 3A:
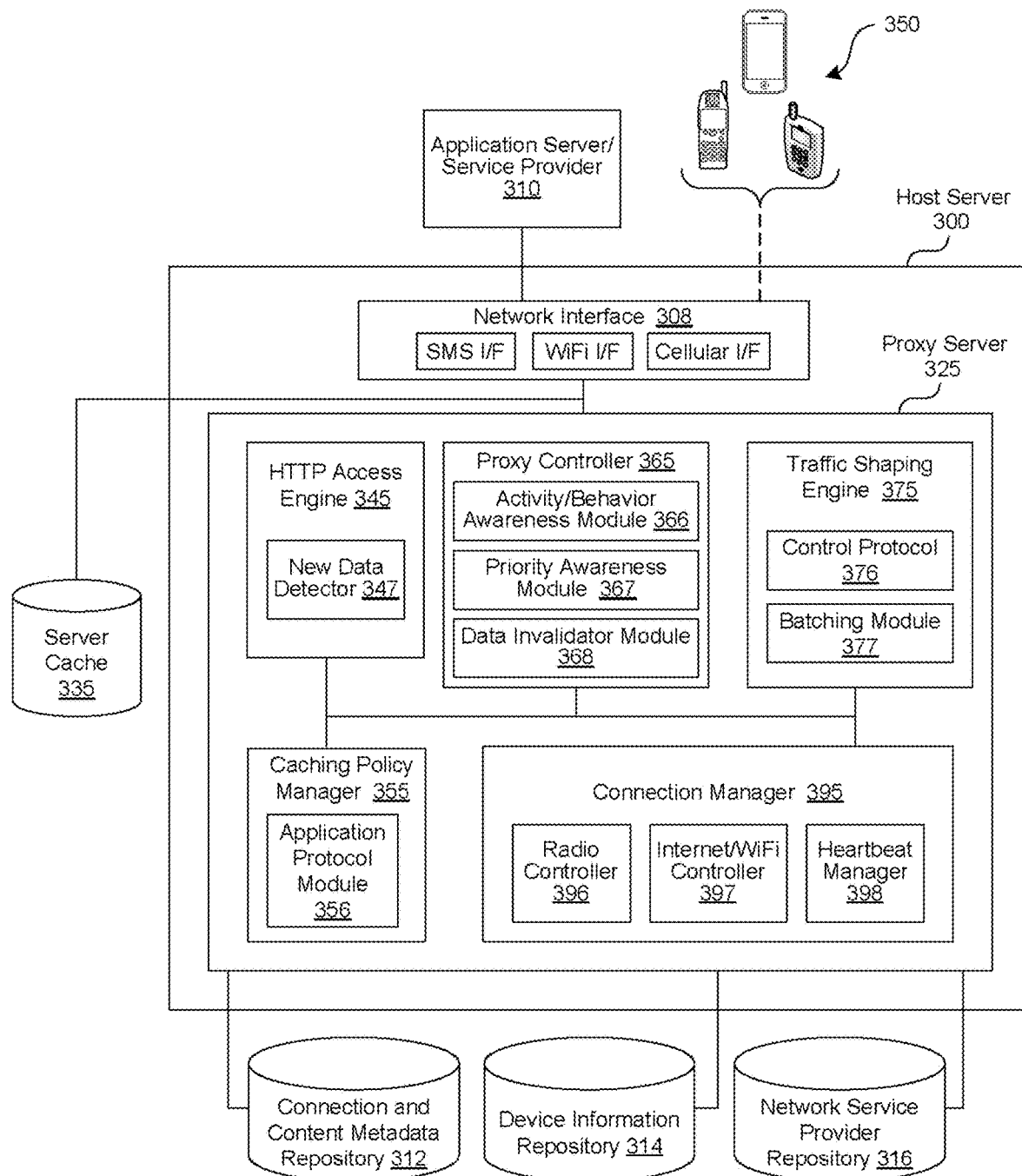
FIG. 3A depicts a block diagram illustrating an example of server-side components in a distributed proxy and cache system that manages traffic in a wireless network for resource conservation.

The proxy 275 is generally application independent and can be used by applications (e.g., both proxy aware and proxy-unaware mobile applications 210 and 220) to open TCP connections to a remote server (e.g., the server 100 in the examples of FIGS. 1A-1B and/or server proxy 125/325 shown in the examples of FIG. 1B and FIG. 3A). In some instances, the local proxy 275 includes a proxy API 225 which can be optionally used to interface with proxy-aware applications 220 (or mobile applications on a mobile device).

The applications 210 and 220 can generally include any user application, widgets, software, HTTP-based application, web browsers, video or other multimedia streaming or downloading application, video games, social network applications, email clients, RSS management applications, application stores, document management applications, productivity enhancement applications, etc. The applications can be provided with the device OS, by the device manufacturer, by the network service provider, downloaded by the user, or provided by others.

One embodiment of the local proxy 275 includes or is coupled to a context API 206, as shown. The context API 206 may be a part of the operating system 204 or device platform or independent of the operating system 204, as illustrated. The operating system 204 can include any operating system including but not limited to, any previous, current, and/or future versions/releases of, Windows Mobile, iOS, Android, Symbian, Palm OS, Brew MP, Java 2 Micro Edition (J2ME), Blackberry, etc.

The context API 206 may be a plug-in to the operating system 204 or a particular client application on the device 250. The context API 206 can detect signals indicative of user or device activity, for example, sensing motion, gesture, device location, changes in device location, device backlight, keystrokes, clicks, activated touch screen, mouse click or detection of other pointer devices. The context API 206 can be coupled to input devices or sensors on the device 250 to identify these signals. Such signals can generally include input received in response to explicit user input at an input device/mechanism at the device 250 and/or collected from ambient signals/contextual cues detected at or in the vicinity of the device 250 (e.g., light, motion, piezoelectric, etc.).

In one embodiment, the user activity module 215 interacts with the context API 206 to identify, determine, infer, detect, compute, predict, and/or anticipate, characteristics of user activity on the device 250. Various inputs collected by the context API 206 can be aggregated by the user activity module 215 to generate a profile for characteristics of user activity. Such a profile can be generated by the module 215 with various temporal characteristics. For instance, user activity profile can be generated in real-time for a given instant to provide a view of what the user is doing or not doing at a given time (e.g., defined by a time window, in the last minute, in the last 30 seconds, etc.), a user activity profile can also be generated for a 'session' defined by an application or web page that describes the characteristics of user behavior with respect to a specific task they are engaged in on the device 250, or for a specific time period (e.g., for the last 2 hours, for the last 5 hours).

Additionally, characteristic profiles can be generated by the user activity module 215 to depict a historical trend for user activity and behavior (e.g., 1 week, 1 mo, 2 mo, etc.). Such historical profiles can also be used to deduce trends of user behavior, for example, access frequency at different times of day, trends for certain days of the week (weekends or week days), user activity trends based on location data (e.g., IP address, GPS, or cell tower coordinate data) or changes in location data (e.g., user activity based on user location, or user activity based on whether the user is on the go, or traveling outside a home region, etc.) to obtain user activity characteristics.

In one embodiment, user activity module 215 can detect and track user activity with respect to applications, documents, files, windows, icons, and folders on the device 250. For example, the user activity module 215 can detect when an application or window (e.g., a web browser) has been exited, closed, minimized, maximized, opened, moved into the foreground, or into the background, multimedia content playback, etc.

In one embodiment, characteristics of the user activity on the device 250 can be used to locally adjust behavior of the device (e.g., mobile device) to optimize its resource consumption such as battery/power consumption and more generally, consumption of other device resources including memory, storage, and processing power. In one embodiment, the use of a radio on a device can be adjusted based on characteristics of user behavior (e.g., by the radio controller 266 of the connection manager 265) coupled to the user activity module 215. For example, the radio controller 266 can turn the radio on or off, based on characteristics of the user activity on the device 250. In addition, the radio controller 266 can adjust the power mode of the radio (e.g., to be in a higher power mode or lower power mode) depending on characteristics of user activity.

In one embodiment, characteristics of the user activity on device 250 can also be used to cause another device (e.g., other computers, a mobile device, or a non-portable device) or server (e.g., host server 100 and 300 in the examples of FIGS. 1A-1B and FIGS. 3A-3B) which can communicate (e.g., via a cellular or other network) with the device 250 to modify its communication frequency with the device 250. The local proxy 275 can use the characteristics information of user behavior determined by the user activity module 215 to instruct the remote device as to how to modulate its communication frequency (e.g., decreasing communication frequency, such as data push frequency if the user is idle, requesting that the remote device notify the device 250 if new data, changed data, different, data, or data of a certain level of importance becomes available, etc.).

In one embodiment, the user activity module 215 can, in response to determining that user activity characteristics indicate that a user is active after a period of inactivity, request that a remote device (e.g., server host server 100 and 300 in the examples of FIGS. 1A-1B and FIGS. 3A-3B) send the data that was buffered as a result of the previously decreased communication frequency.

In addition, or in alternative, the local proxy 275 can communicate the characteristics of user activity at the device 250 to the remote device (e.g., host server 100 and 300 in the examples of FIGS. 1A-B and FIGS. 3A-3B) and the remote device determines how to alter its own communication frequency with the device 250 for network resource conservation and conservation of device 250 resources.

One embodiment of the local proxy 275 further includes a request/transaction manager 235, which can detect, identify, intercept, process, manage, data requests initiated on the device 250, for example, by applications 210 and/or 220, and/or directly/indirectly by a user request. The request/ transaction manager 235 can determine how and when to process a given request or transaction, or a set of requests/transactions, based on transaction characteristics.

The request/transaction manager 235 can prioritize requests or transactions made by applications and/or users at the device 250, for example by the prioritization engine 241. Importance or priority of requests/transactions can be determined by the manager 235 by applying a rule set, for example, according to time sensitivity of the transaction, time sensitivity of the content in the transaction, time criticality of the transaction, time criticality of the data transmitted in the transaction, and/or time criticality or importance of an application making the request.

In addition, transaction characteristics can also depend on whether the transaction was a result of user-interaction or other user initiated action on the device (e.g., user interaction with a mobile application). In general, a time critical transaction can include a transaction resulting from a user-initiated data transfer, and can be prioritized as such. Transaction characteristics can also depend on the amount of data that will be transferred or is anticipated to be transferred as a result of the request/requested transaction. For example, the connection manager 265, can adjust the radio mode (e.g., high power or low power mode via the radio controller 266) based on the amount of data that will need to be transferred.

In addition, the radio controller 266/connection manager 265 can adjust the radio power mode (high or low) based on time criticality/sensitivity of the transaction. The radio controller 266 can trigger the use of high power radio mode when a time-critical transaction (e.g., a transaction resulting from a user-initiated data transfer, an application running in the foreground, any other event meeting a certain criteria) is initiated or detected.

In general, the priorities can be determined or set by default, for example, based on device platform, device manufacturer, operating system, etc. Priorities can alternatively or in additionally be set by the particular application; for example, the Facebook mobile application can set its own priorities for various transactions (e.g., a status update can be of higher priority than an add friend request or a poke request, a message send request can be of higher priority than a message delete request, for example), an email client or IM chat client may have its own configurations for priority. The prioritization engine 241 may include set of rules for assigning priority.

The prioritization engine 241 can also track network provider limitations or specifications on application or transaction priority in determining an overall priority status for a request/transaction. Furthermore, priority can in part or in whole be determined by user preferences, either explicit or implicit. A user, can in general, set priorities at different tiers, such as, specific priorities for sessions, or types, or applications (e.g., a browsing session, a gaming session, versus an IM chat session, the user may set a gaming session to always have higher priority than an IM chat session, which may have higher priority than web-browsing session). A user can set application-specific priorities, (e.g., a user may set Facebook related transactions to have a higher priority than LinkedIn related transactions), for specific transaction types (e.g., for all send message requests across all applications to have higher priority than message delete requests, for all calendar-related events to have a high priority, etc.), and/or for specific folders.

The prioritization engine 241 can track and resolve conflicts in priorities set by different entities. For example, manual settings specified by the user may take precedence over device OS settings, network provider parameters/limitations (e.g., set in default for a network service area, geographic locale, set for a specific time of day, or set based on service/fee type) may limit any user-specified settings and/or application-set priorities. In some instances, a manual sync request received from a user can override some, most, or all priority settings in that the requested synchronization is performed when requested, regardless of the individually assigned priority or an overall priority ranking for the requested action.

Priority can be specified and tracked internally in any known and/or convenient manner, including but not limited to, a binary representation, a multi-valued representation, a graded representation and all are considered to be within the scope of the disclosed technology.

TABLE I

| Change (initiated on device) | Priority | Change (initiated on server) | Priority |
|---|---|---|---|
| Send email | High | Receive email | High |
| Delete email | Low | Edit email | Often not possible to sync (Low if possible) |
| (Un)read email | Low | | |
| Move message | Low | | |
| Read more | High | | |
| Down load attachment | High | New email in deleted items | Low |
| New Calendar event | High | Delete an email | Low |
| Edit/change Calendar event | High | (Un)Read an email | Low |
| | | Move messages | Low |
| Add a contact | High | Any calendar change | High |
| Edit a contact | High | Any contact change | High |
| Search contacts | High | Wipe/lock device | High |
| Change a setting | High | Settings change | High |
| Manual send/receive | High | Any folder change | High |
| IM status change | Medium | Connector restart | High (if no changes nothing is sent) |
| Auction outbid or change notification | High | | |
| Weather Updates | Low | Social Network Status Updates | Medium |
| | | Severe Weather Alerts | High |
| | | News Updates | Low |

Table I above shows, for illustration purposes, some examples of transactions with examples of assigned priorities in a binary representation scheme. Additional assignments are possible for additional types of events, requests, transactions, and as previously described, priority assignments can be made at more or less granular levels, e.g., at the session level or at the application level, etc.

As shown by way of example in the above table, in general, lower priority requests/transactions can include, updating message status as being read, unread, deleting of messages, deletion of contacts; higher priority requests/transactions, can in some instances include, status updates, new IM chat message, new email, calendar event update/cancellation/deletion, an event in a mobile gaming session, or other entertainment related events, a purchase confirmation through a web purchase or online, request to load additional or download content, contact book related events, a transaction to change a device setting, location-aware or location-based events/transactions, or any other events/request/transactions initiated by a user or where the user is known to be, expected to be, or suspected to be waiting for a response, etc.

Inbox pruning events (e.g., email, or any other types of messages), are generally considered low priority and absent other impending events, generally will not trigger use of the radio on the device 250. Specifically, pruning events to remove old email or other content can be 'piggy backed' with other communications if the radio is not otherwise on, at the time of a scheduled pruning event. For example, if the user has preferences set to 'keep messages for 7 days old,' then instead of powering on the device radio to initiate a message delete from the device 250 the moment that the message has exceeded 7 days old, the message is deleted when the radio is powered on next. If the radio is already on, then pruning may occur as regularly scheduled.

The request/transaction manager 235, can use the priorities for requests (e.g., by the prioritization engine 241) to manage outgoing traffic from the device 250 for resource optimization (e.g., to utilize the device radio more efficiently for battery conservation). For example, transactions/requests below a certain priority ranking may not trigger use of the radio on the device 250 if the radio is not already switched on, as controlled by the connection manager 265. In contrast, the radio controller 266 can turn on the radio such a request can be sent when a request for a transaction is detected to be over a certain priority level.

In one embodiment, priority assignments (such as that determined by the local proxy 275 or another device/entity) can be used cause a remote device to modify its communication with the frequency with the mobile device. For example, the remote device can be configured to send notifications to the device 250 when data of higher importance is available to be sent to the mobile device.

In one embodiment, transaction priority can be used in conjunction with characteristics of user activity in shaping or managing traffic, for example, by the traffic shaping engine 255. For example, the traffic shaping engine 255 can, in response to detecting that a user is dormant or inactive, wait to send low priority transactions from the device 250, for a period of time. In addition, the traffic shaping engine 255 can allow multiple low priority transactions to accumulate for batch transferring from the device 250 (e.g., via the batching module 257). In one embodiment, the priorities can be set, configured, or readjusted by a user. For example, content depicted in Table I in the same or similar form can be accessible in a user interface on the device 250 and for example, used by the user to adjust or view the priorities.

The batching module 257 can initiate batch transfer based on certain criteria. For example, batch transfer (e.g., of multiple occurrences of events, some of which occurred at different instances in time) may occur after a certain number of low priority events have been detected, or after an amount of time elapsed after the first of the low priority event was initiated. In addition, the batching module 257 can initiate batch transfer of the cumulated low priority events when a higher priority event is initiated or detected at the device 250. Batch transfer can otherwise be initiated when radio use is triggered for another reason (e.g., to receive data from a remote device such as host server 100 or 300). In one embodiment, an impending pruning event (pruning of an inbox), or any other low priority events, can be executed when a batch transfer occurs.

In general, the batching capability can be disabled or enabled at the event/transaction level, application level, or session level, based on any one or combination of the following: user configuration, device limitations/settings, manufacturer specification, network provider parameters/limitations, platform specific limitations/settings, device OS settings, etc. In one embodiment, batch transfer can be initiated when an application/window/file is closed out, exited, or moved into the background; users can optionally be prompted before initiating a batch transfer; users can also manually trigger batch transfers.

In one embodiment, the local proxy 275 locally adjusts radio use on the device 250 by caching data in the cache 285.

When requests or transactions from the device 250 can be satisfied by content stored in the cache 285, the radio controller 266 need not activate the radio to send the request to a remote entity (e.g., the host server 100, 300, as shown in FIGS. 1A-1B and FIGS. 3A-3B or a content provider/application server such as the server/provider 110 shown in the examples of FIGS. 1A-1B). As such, the local proxy 275 can use the local cache 285 and the cache policy manager 245 to locally store data for satisfying data requests to eliminate or reduce the use of the device radio for conservation of network resources and device battery consumption.

In leveraging the local cache, once the request/transaction manager 225 intercepts a data request by an application on the device 250, the local repository 285 can be queried to determine if there is any locally stored response, and also determine whether the response is valid. When a valid response is available in the local cache 285, the response can be provided to the application on the device 250 without the device 250 needing to access the cellular network.

If a valid response is not available, the local proxy 275 can query a remote proxy (e.g., the server proxy 325 of FIG. 3A) to determine whether a remotely stored response is valid. If so, the remotely stored response (e.g., which may be stored on the server cache 135 or optional caching server 199 shown in the example of FIG. 1B) can be provided to the mobile device, possibly without the mobile device 250 needing to access the cellular network, thus relieving consumption of network resources.

If a valid cache response is not available, or if cache responses are unavailable for the intercepted data request, the local proxy 275, for example, the caching policy manager 245, can send the data request to a remote proxy (e.g., server proxy 325 of FIG. 3A) which forwards the data request to a content source (e.g., application server/content provider 110 of FIG. 1A) and a response from the content source can be provided through the remote proxy, as will be further described in the description associated with the example host server 300 of FIG. 3A. The cache policy manager 245 can manage or process requests that use a variety of protocols, including but not limited to HTTP, HTTPS, IMAP, POP, SMTP and/or ActiveSync. The caching policy manager 245 can locally store responses for data requests in the local database 285 as cache entries, for subsequent use in satisfying same or similar data requests.

The manager 245 can request that the remote proxy monitor responses for the data request, and the remote proxy can notify the device 250 when an unexpected response to the data request is detected. In such an event, the cache policy manager 245 can erase or replace the locally stored response(s) on the device 250 when notified of the unexpected response (e.g., new data, changed data, additional data, different response, etc.) to the data request. In one embodiment, the caching policy manager 245 is able to detect or identify the protocol used for a specific request, including but not limited to HTTP, HTTPS, IMAP, POP, SMTP and/or ActiveSync. In one embodiment, application specific handlers (e.g., via the application protocol module 246 of the manager 245) on the local proxy 275 allows for optimization of any protocol that can be port mapped to a handler in the distributed proxy (e.g., port mapped on the proxy server 325 in the example of FIG. 3A).

In one embodiment, the local proxy 275 notifies the remote proxy such that the remote proxy can monitor responses received for the data request from the content source for changed results prior to returning the result to the device 250, for example, when the data request to the content source has yielded same results to be returned to the mobile device. In general, the local proxy 275 can simulate application server responses for applications on the device 250, using locally cached content. This can prevent utilization of the cellular network for transactions where new/changed/different data is not available, thus freeing up network resources and preventing network congestion.

In one embodiment, the local proxy 275 includes an application behavior detector 236 to track, detect, observe, monitor, applications (e.g., proxy aware and/or unaware applications 210 and 220) accessed or installed on the device 250. Application behaviors, or patterns in detected behaviors (e.g., via the pattern detector 237) of one or more applications accessed on the device 250 can be used by the local proxy 275 to optimize traffic in a wireless network needed to satisfy the data needs of these applications.

For example, based on detected behavior of multiple applications, the traffic shaping engine 255 can align content requests made by at least some of the applications over the network (wireless network) (e.g., via the alignment module 256). The alignment module can delay or expedite some earlier received requests to achieve alignment. When requests are aligned, the traffic shaping engine 255 can utilize the connection manager to poll over the network to satisfy application data requests. Content requests for multiple applications can be aligned based on behavior patterns or rules/settings including, for example, content types requested by the multiple applications (audio, video, text, etc.), mobile device parameters, and/or network parameters/traffic conditions, network service provider constraints/specifications, etc.

In one embodiment, the pattern detector 237 can detect recurrences in application requests made by the multiple applications, for example, by tracking patterns in application behavior. A tracked pattern can include, detecting that certain applications, as a background process, poll an application server regularly, at certain times of day, on certain days of the week, periodically in a predictable fashion, with a certain frequency, with a certain frequency in response to a certain type of event, in response to a certain type user query, frequency that requested content is the same, frequency with which a same request is made, interval between requests, applications making a request, or any combination of the above, for example.

Such recurrences can be used by traffic shaping engine 255 to offload polling of content from a content source (e.g., from an application server/content provider 110 of FIGS. 1A-1B) that would result from the application requests that would be performed at the mobile device 250 to be performed instead, by a proxy server (e.g., proxy server 125 of FIG. 1B or proxy server 325 of FIG. 3A) remote from the device 250. Traffic engine 255 can decide to offload the polling when the recurrences match a rule. For example, there are multiple occurrences or requests for the same resource that have exactly the same content, or returned value, or based on detection of repeatable time periods between requests and responses such as a resource that is requested at specific times during the day. The offloading of the polling can decrease the amount of bandwidth consumption needed by the mobile device 250 to establish a wireless (cellular) connection with the content source for repetitive content polls.

As a result of the offloading of the polling, locally cached content stored in the local cache 285 can be provided to satisfy data requests at the device 250, when content change is not detected in the polling of the content sources. As such, when data has not changed, application data needs can be satisfied without needing to enable radio use or occupying cellular bandwidth in a wireless network. When data has changed, or when data is different, and/or new data has been received, the remote entity to which polling is offloaded, can notify the device 250. The remote entity may be the host server 300 as shown in the example of FIG. 3A.

In one embodiment, the local proxy 275 can mitigate the need/use of periodic keep alive messages (heartbeat messages) to maintain TCP/IP connections, which can consume significant amounts of power thus having detrimental impacts on mobile device battery life. The connection manager 265 in the local proxy (e.g., the heartbeat manager 267) can detect, identify, and intercept any or all heartbeat (keep-alive) messages being sent from applications.

The heartbeat manager 267 can prevent any or all of these heartbeat messages from being sent over the cellular, or other network, and instead rely on the server component of the distributed proxy system (e.g., shown in FIG. 1B) to generate the and send the heartbeat messages to maintain a connection with the backend (e.g., app server/provider 110 in the example of FIGS. 1A-1B).

The local proxy 275 generally represents any one or a portion of the functions described for the individual managers, modules, and/or engines. The local proxy 275 and device 250 can include additional or less components; more or less functions can be included, in whole or in part, without deviating from the novel art of the disclosure.

Figure 2B:
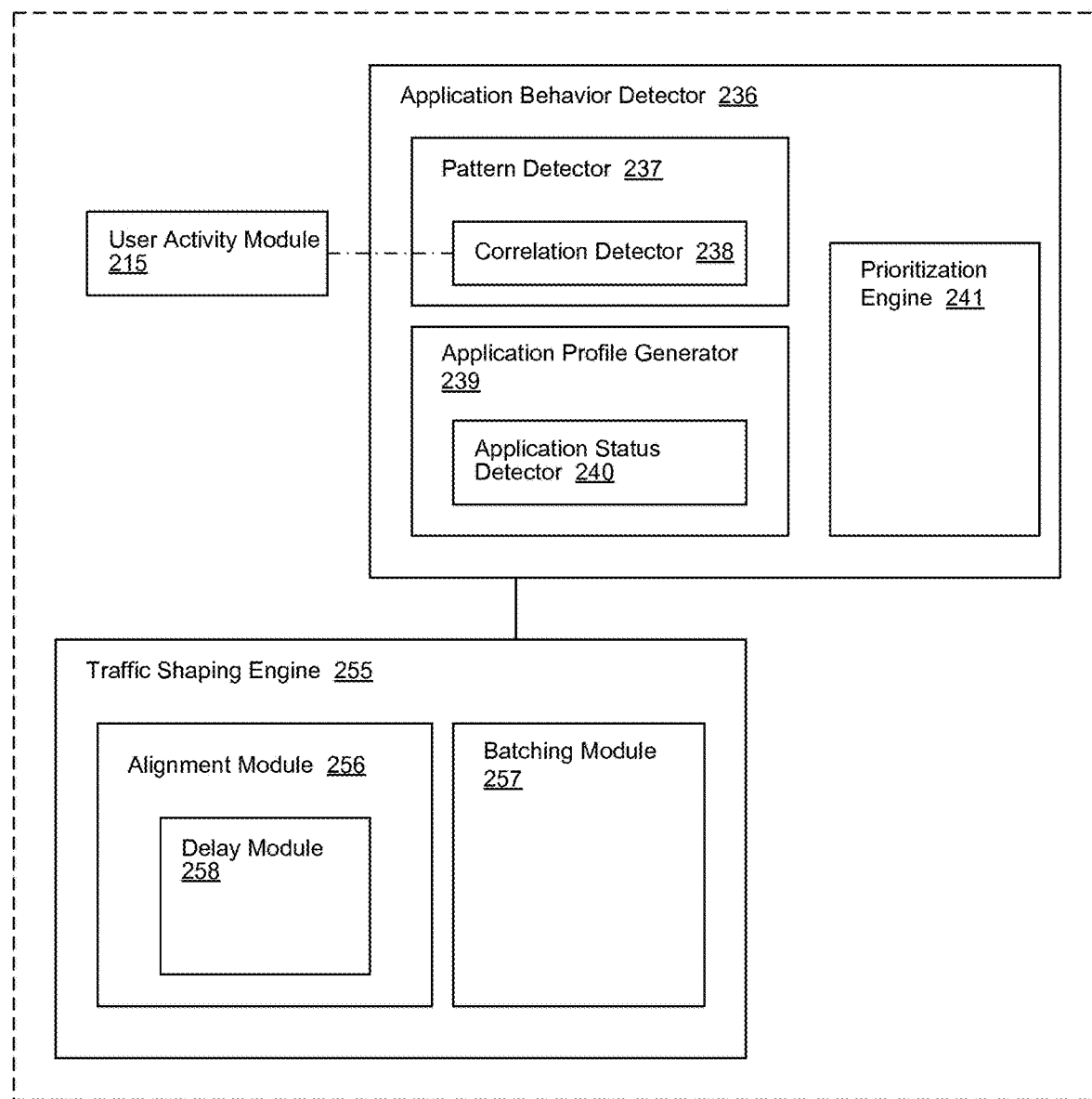
FIG. 2B depicts a block diagram illustrating another example of components in the application behavior detector and the traffic shaping engine in the local proxy on the client-side of the distributed proxy system shown in the example of FIG. 2A.

FIG. 2B depicts a block diagram illustrating another example of components in the application behavior detector 236 and the traffic shaping engine 255 in the local proxy 275 on the client-side of the distributed proxy system shown in the example of FIG. 2A.

In one embodiment, the pattern detector 237 of the application behavior detector 236 further includes a correlation detector 238 and the application profile generator 239 further includes an application status detector 240.

The correlation detector 238, in one embodiment, can detect, determine, identify, compute, track, any correlations in the timing of data transfer requests made by applications, agents, and/or widgets accessed via (e.g., application streaming or accessed through a cloud) or running on the device 250.

In general, correlation types include event-level correlations and application-level correlations, and can include system/application. The correlation detector 238 can track and monitor system/application triggered events and/or user-triggered events/transactions. In addition, the correlation detector 238 can identify or track correlations between events for a given application or across different applications.

A correlation can be detected, for example, when a first event/transaction type of a first application triggers the initiation of a second event/transaction type of the same application. The triggering can be detected by the correlation detector 238 through identifying patterns in the timing characteristics of such events occurring within the first application. For example, a correlation can include, an identification of the ordering of the first and second event/transaction types (e.g., the second event type always occurs after the first event type). A correlation can also include, determining that the first and second event/transaction types occur within a timeframe of one another (e.g., the first event type occurs within a 10 ms time window of the second event type), etc.

A correlation can also be detected, for example, when a specific event type of one application triggers a specific event type of another application (or has a timing or ordering relationship thereof). Similarly, the correlation detector 238 can detect that operation of one application (e.g., such as the launching of one application or any other activity) is related to the operation of another application. For example, the detector can determine that if one application is launched, the other application is also launched.

The detector can also detect that one application is always launched within a certain time window of another application being launched/accessed, or the activity status of one application is linked to the application status of the activity status of another application (e.g., when one application moves into the foreground/background, the other application moves into the foreground/background, or when one application becomes active/inactive, the other application also changes state and becomes either active or inactive, etc.). Generally, such events/transactions detected and tracked for correlation can include system or application-initiated events, or user-triggered events (e.g., including explicit user requests or implicit user requests).

In some instances, the correlation detector 238 uses user activity module 215 and can also detect application or application event correlations in relation to and/or in conjunction with user activity. For example, the correlation detector 238 can determine that an occurrence of a first event type frequently causes the user to perform an action which triggers a second event (of the same application or different application). While examples are described herein for two events and examples given for two applications, note that the correlation detector 238 can track, detect, and identify correlations in occurrences of events/transactions, correlations for multiple events (e.g., 2, 3, 4, 5, etc.) that can be detected and identified.

In general, the correlation detector 238 tracks the timing characteristics of requests made by applications to detect correlations. The correlations can be incorporated into an application's profile by the profile generator 239.

In one embodiment, the profile generator includes an application status detector 240. The application status detector 240 can detect an activity state of an application on the device 250. An activity state can indicate, by way of example but not limitation, whether a specific application is operating in the background or foreground on the mobile device 250, whether the application is active or inactive, whether the application is being interacted with (e.g., by a user, or another application or device). The activity state or status of an application on the device 250 can also be included in an application's profile (e.g., by the profile generator 239) along with any correlation with other events or applications and used for data request alignment.

For example, one embodiment of the alignment module 256 of the traffic shaping engine 255 which is able to use the application behavior (e.g., as determined by the application behavior detector 236) of one or multiple applications on a device 250 to align some of the content requests (e.g., aligned by the alignment module 256) made by the same application or at least a portion the multiple applications from the mobile device over the network. The application behaviors can be indicated in application profiles generated by the application profile generator 239, for example.

In some instances the content requests (made by the same application or different applications) are aligned by delaying or expediting a time at which some of the content requests would occur without alignment and the traffic shaping engine 256 can transfer the content requests that are delayed or expedited in a single transfer operation over the network (cellular or other wireless network). The amount of time that a request can be delayed (time 'D') is generally determined (e.g., by the delay module 258) to optimize a number of content requests able to be aligned in the single transfer operation. Hence delay module 258 can utilize the correlations in event/transaction occurrences within an application or across multiple applications as identified by the correlation detector 238 in determining delay time for aligning multiple requests.

The delay time 'D' (e.g., refers to the time by which a request is expedited or delayed) is generally determined based on application behavior (e.g., as determined by the application behavior detector 236 and/or indicated in an application profile). More specifically, the time that is delayed in transfer of a given content request can be determined based on priority of a specific application (e.g., as determined by the prioritization engine 241 of the application behavior detector 236) making the given content request, or based on the priority of the specific application relative to other applications on the mobile device 250. In addition, the delay module 258 can determine delays in transfer further based on, one or more of amount of data involved in the given content request, a nature of data involved in the given content request, usable lifetime of data to be transferred in the given content request, and/or network characteristics including available bandwidth or network latency.

Thus in one example of a system level operation in aligning requests, the local proxy 275 of the device 250 detects a first data request made via a first application and a second data request made via a second application, or where first and second data requests are made by the same application. The alignment module 256 of the traffic shaping engine 255 in the local proxy 275 on the device 250 can delay the transfer of the first data transfer request made via the first application to the proxy server (e.g., proxy server 125 or 325 in the examples of FIG. 1B and FIG. 3A) until another data transfer request made via the second application is detected by the local proxy 275 such that the transfer the first data transfer request and the second data transfer request occur in a single transfer operation over the network (thus needing to enable radio use only once, assuming that the radio was off on the device 250 when the first data request occurred).

The delay of the first data transfer request can be determined by the delay module 258 and the decision can be made when, for example, the second application is of a higher priority relative to the first application, or that the second application is running in the foreground, or that a user is interacting with the second application and the second data request is initiated in response to the user interaction, or that the second application is more data intensive than the first application.

Figure 2C:
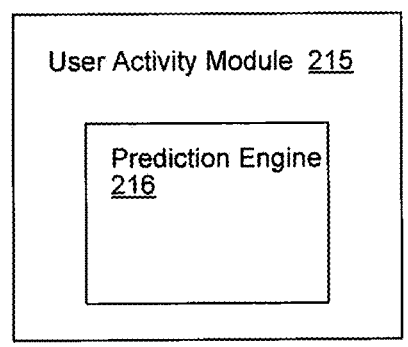
FIG. 2C depicts a block diagram illustrating another example of the user activity module having a prediction engine in the local proxy on the client-side of the distributed proxy system shown in the example of FIG. 2A.

FIG. 2C depicts a block diagram illustrating another example of the user activity module 215 having a prediction engine 216 in the local proxy 275 on the client-side of the distributed proxy system shown in the example of FIG. 2A.

As described in FIG. 2A, the user activity module 215 is able to detect, track, monitor, process, analyze, user activities at the mobile device 250. The user activities can be used to determine user activity characteristics such as tracking user activity given the time of day or day of the week, tracking frequency of application use, tracking an order with which new data is accessed or an order with which applications are accessed on the mobile device, etc. The activity module 215 can generally detect, determine, track, analyze user actions to determine characteristics for user actions, which can include habits, tendencies, or patterns.

The activity module 215 can identify a user's general behavior with respect to using the device 250. For example, the activity module 215 can determine that a user uses the device 250 more frequently during certain hours of the day, or days of the week; the module can determine that the user 250 has a preference for calling vs. SMS based on time, day of week, etc; time/day-dependent preference for using certain applications, types of applications, checking certain email accounts (e.g., if a user tends to check one email account more frequently during the week and another email account during the weekend), time/day-dependent frequency of checking certain applications (e.g., if a user checks Facebook more often on weekends, or in the afternoons during weekdays compared to in the morning; if a user Tweets more at night or in the day time; if a user uses Yelp mobile more on the weekends or on the weekdays, or during the daytime or night time); if a user tends to access, launch, check applications, accounts, services in a certain order (whether the ordering has time/day dependencies).

The user's behavior with respect to a particular application can be determined by the module 215. For example, the activity module 215 can detect, identify, analyze, or process a user's activities on a certain application, account, or service. The module 215 can, for instance, determine that the user tends to use certain features but not others on a certain application (e.g., a user tends to use Facebook Walls for messaging rather than private messaging), a user tends to communicate with one individual via one service and another individual via another service, etc.

In addition to time/day dependent preferences or time/day dependent frequencies of use/access, the above actions may also include location-based dependencies, or location-based dependencies in conjunction with time/day based dependencies. For example, the activity module 215 can determine that a user uses Google maps when the device 250 is detected to be on-the-go, or when the user is away from a specific geo-location (e.g., home location or office location), etc. The activity module 215 can determine that the frequency with which a user uses certain applications or accounts changes with geo-location, and/or when the user is determined to be on-the-go, or traveling, etc.

In one embodiment, the user activity module 215 can detect, identify, and/or determining a user's quiet time (e.g., the user is sleeping or otherwise does not use the device 250 (e.g., or if the user is driving/commuting), a time when the user turns off certain connections, closes out of certain applications, or does not check certain applications, accounts, and/or services, etc.

Based on the tracked user behaviors, activities, habits, tendencies, the prediction engine 216 can use any of the information related to user activity characteristics to predict user behavior, and use the predicted user behavior to anticipate or predict future activity sessions at the device 250. Predicted activity sessions can be used to facilitate data transfer to optimize network use and can have the advantage of also enhancing user experience with mobile applications/accounts.

For example, the prediction engine 216 can communicate any predicted activity sessions or predicted user behavior to the proxy server 325 for use in determining a timing with which to transfer impending data from the host server (e.g., server 300 of FIG. 3A) to the device 250. For example, the prediction engine 216 may, based on determined user activities and past behavior, determine that the user typically accesses his/her Outlook Enterprise email account at around 7:30 am most week day mornings. The prediction engine 216 can then generate a predicted activity session for this email access event for use by the host server to time when emails for the email account are transmitted to the device 250.

For example, the server may not need to initiate a transaction to push emails received between 3 am-7 am to the device 250 until around 7:15 or some time before the predicted activity session since the user is not expected to access it until around 7:30 am. This way, network resources can be conserved, as can power consumption of the device 250.

Figure 3B:
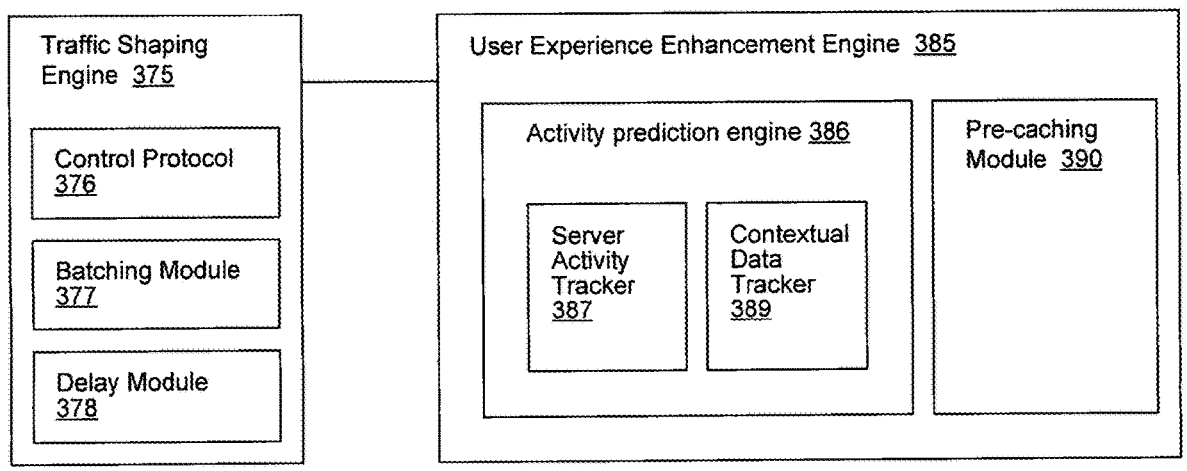
FIG. 3B depicts a block diagram illustrating another example of the server-side components of the distributed proxy system shown in the example of FIG. 3A as further including a user experience enhancement engine and with the traffic shaping engine further including a delay module.

In some instances, the server can in addition to, or instead use the behavior of a content provider/application server (e.g., the server/provider 110 in the examples of FIG. 1A-1B with which the mobile device 250 interacts to satisfy content requests or needs of the device 250) to determine an optimal timing with which to transfer data to the mobile device, as will be further described in conjunction with the example of FIG. 3B. The activity of the provider/server can be detected and/or tracked through the server-side of the proxy system, as shown in the example of FIG. 3B.

FIG. 3A depicts a block diagram illustrating an example of server-side components in a distributed proxy and cache system residing on a host server 300 that manages traffic in a wireless network for resource conservation.

The host server 300 generally includes, for example, a network interface 308 and/or one or more repositories 312, 314, 316. Note that server 300 may be any portable/mobile or non-portable device, server, cluster of computers and/or other types of processing units (e.g., any number of a machine shown in the example of FIG. 11) able to receive, transmit signals to satisfy data requests over a network including any wired or wireless networks (e.g., Wi-Fi, cellular, Bluetooth, etc.).

The network interface 308 can include networking module(s) or devices(s) that enable the server 300 to mediate data in a network with an entity that is external to the host server 300, through any known and/or convenient communications protocol supported by the host and the external entity. Specifically, the network interface 308 allows the server 308 to communicate with multiple devices including mobile phone devices 350, and/or one or more application servers/content providers 310.

The host server 300 can store information about connections (e.g., network characteristics, conditions, types of connections, etc.) with devices in the connection metadata repository 312. Additionally, any information about third party application or content providers can also be stored in 312. The host server 300 can store information about devices (e.g., hardware capability, properties, device settings, device language, network capability, manufacturer, device model, OS, OS version, etc.) in the device information repository 314. Additionally, the host server 300 can store information about network providers and the various network service areas in the network service provider repository 316.

The communication enabled by 308 allows for simultaneous connections (e.g., including cellular connections) with devices 350 and/or connections (e.g., including wired/wireless, HTTP, Internet connections, LAN, Wi-Fi, etc.) with content servers/providers 310, to manage the traffic between devices 350 and content providers 310, for optimizing network resource utilization and/or to conserver power (battery) consumption on the serviced devices 350. The host server 300 can communicate with mobile devices 350 serviced by different network service providers and/or in the same/different network service areas. The host server 300 can operate and is compatible with devices 350 with varying types or levels of mobile capabilities, including by way of example but not limitation, 1G, 2G, 2G transitional (2.5G, 2.75G), 3G (IMT-2000), 3G transitional (3.5G, 3.75G, 3.9G), 4G (IMT-advanced), etc.

In general, the network interface 308 can include one or more of a network adaptor card, a wireless network interface card (e.g., SMS interface, Wi-Fi interface, interfaces for various generations of mobile communication standards including but not limited to 1G, 2G, 3G, 3.5G, 4G type networks such as LTE, WiMAX, etc.), Bluetooth, Wi-Fi, or any other network whether or not connected via a a router, an access point, a wireless router, a switch, a multilayer switch, a protocol converter, a gateway, a bridge, bridge router, a hub, a digital media receiver, and/or a repeater.

The host server 300 can further include, server-side components of the distributed proxy and cache system which can include, a proxy server 325 and a server cache 335. In one embodiment, the server proxy 325 can include an HTTP access engine 345, a caching policy manager 355, a proxy controller 365, a traffic shaping engine 375, a new data detector 386, and/or a connection manager 395.

The HTTP access engine 345 may further include a heartbeat manager 346, the proxy controller 365 may further include a data invalidator module 366, the traffic shaping engine 375 may further include a control protocol 276 and a batching module 377. Additional or less components/modules/engines can be included in the proxy server 325 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

In the example of a device (e.g., mobile device 350) making an application or content request to an app server or content provider 310, the request may be intercepted and routed to the proxy server 325, which is coupled to the device 350 and the provider 310. Specifically, the proxy server is able to communicate with the local proxy (e.g., proxy 175 and 275 of the examples of FIG. 1 and FIGS. 2A-2C respectively) of the device 350, the local proxy forwards the data request to the proxy server 325 for, in some instances, further processing, and if needed, for transmission to the content server 310 for a response to the data request.

In such a configuration, the host 300, or the proxy server 325 in the host server 300 can utilize intelligent information provided by the local proxy in adjusting its communication with the device in such a manner that optimizes use of network and device resources. For example, the proxy server 325 can identify characteristics of user activity on the device 350 to modify its communication frequency. The characteristics of user activity can be determined by, for example, the activity/behavior awareness module 366 in the proxy controller 365, via information collected by the local proxy on the device 350.

In one embodiment, communication frequency can be controlled by the connection manager 396 of the proxy server 325, for example, to adjust push frequency of content or updates to the device 350. For instance, push frequency can be decreased by the connection manager 396 when characteristics of the user activity indicate that the user is inactive. In one embodiment, when the characteristics of the user activity indicate that the user is subsequently active after a period of inactivity, the connection manager 396 can adjust the communication frequency with the device 350 to send data that was buffered as a result of decreased communication frequency, to the device 350.

In addition, the proxy server 325 includes priority awareness of various requests, transactions, sessions, applications, and/or specific events. Such awareness can be determined by the local proxy on the device 350 and provided to the proxy server 325. The priority awareness module 367 of the proxy server 325 can generally assess the priority (e.g., including time-criticality, time-sensitivity, etc.) of various events or applications; additionally, the priority awareness module 367 can track priorities determined by local proxies of devices 350.

In one embodiment, through priority awareness, the connection manager 395 can further modify communication frequency (e.g., use or radio as controlled by the radio controller 396) of the server 300 with the devices 350. For example, the server 300 can notify the device 350, thus requesting use of the radio if it is not already in use, when data or updates of an importance/priority level which meets a criteria becomes available to be sent.

In one embodiment, the proxy server 325 can detect multiple occurrences of events (e.g., transactions, content, data received from server/provider 310) and allow the events to accumulate for batch transfer to device 350. Batch transfer can be cumulated and transfer of events can be delayed based on priority awareness and/or user activity/application behavior awareness, as tracked by modules 366 and/or 367. For example, batch transfer of multiple events (of a lower priority) to the device 350 can be initiated by the batching module 377 when an event of a higher priority (meeting a threshold or criteria) is detected at the server 300. In addition, batch transfer from the server 300 can be triggered when the server receives data from the device 350, indicating that the device radio is already in use and is thus on. In one embodiment, the proxy server 324 can order the each messages/packets in a batch for transmission based on event/transaction priority, such that higher priority content can be sent first, in case connection is lost or the battery dies, etc.

In one embodiment, the server 300 caches data (e.g., as managed by the caching policy manager 355) such that communication frequency over a network (e.g., cellular network) with the device 350 can be modified (e.g., decreased). The data can be cached, for example in the server cache 335, for subsequent retrieval or batch sending to the device 350 to potentially decrease the need to turn on the device 350 radio. The server cache 335 can be partially or wholly internal to the host server 300, although in the example of FIG. 3A, it is shown as being external to the host 300. In some instances, the server cache 335 may be the same as and/or integrated in part or in whole with another cache managed by another entity (e.g., the optional caching proxy server 199 shown in the example of FIG. 1B), such as being managed by an application server/content provider 110, a network service provider, or another third party.

In one embodiment, content caching is performed locally on the device 350 with the assistance of host server 300. For example, proxy server 325 in the host server 300 can query the application server/provider 310 with requests and monitor changes in responses. When changed, different or new responses are detected (e.g., by the new data detector 347), the proxy server 325 can notify the mobile device 350, such that the local proxy on the device 350 can make the decision to invalidate (e.g., indicated as outdated) the relevant cache entries stored as any responses in its local cache. Alternatively, the data invalidator module 368 can automatically instruct the local proxy of the device 350 to invalidate certain cached data, based on received responses from the application server/provider 310. The cached data is marked as invalid, and can get replaced or deleted when new content is received from the content server 310.

Note that data change can be detected by the detector 347 in one or more ways. For example, the server/provider 310 can notify the host server 300 upon a change. The change can also be detected at the host server 300 in response to a direct poll of the source server/provider 310. In some instances, the proxy server 325 can in addition, pre-load the local cache on the device 350 with the new/updated/changed/different data. This can be performed when the host server 300 detects that the radio on the mobile device is already in use, or when the server 300 has additional content/data to be sent to the device 350.

One or more the above mechanisms can be implemented simultaneously or adjusted/configured based on application (e.g., different policies for different servers/providers 310). In some instances, the source provider/server 310 may notify the host 300 for certain types of events (e.g., events meeting a priority threshold level). In addition, the provider/server 310 may be configured to notify the host 300 at specific time intervals, regardless of event priority.

In one embodiment, the proxy server 325 of the host 300 can monitor/track responses received for the data request from the content source for changed results prior to returning the result to the mobile device, such monitoring may be suitable when data request to the content source has yielded same results to be returned to the mobile device, thus preventing network/power consumption from being used when no new/changes are made to a particular requested. The local proxy of the device 350 can instruct the proxy server 325 to perform such monitoring or the proxy server 325 can automatically initiate such a process upon receiving a certain number of the same responses (e.g., or a number of the same responses in a period of time) for a particular request.

In one embodiment, the server 300, for example, through the activity/behavior awareness module 366, is able to identify or detect user activity, at a device that is separate from the mobile device 350. For example, the module 366 may detect that a user's message inbox (e.g., email or types of inbox) is being accessed. This can indicate that the user is interacting with his/her application using a device other than the mobile device 350 and may not need frequent updates, if at all.

The server 300, in this instance, can thus decrease the frequency with which new, different, changed, or updated content is sent to the mobile device 350, or eliminate all communication for as long as the user is detected to be using another device for access. Such frequency decrease may be application specific (e.g., for the application with which the user is interacting with on another device), or it may be a general frequency decrease (e.g., since the user is detected to be interacting with one server or one application via another device, he/she could also use it to access other services) to the mobile device 350.

In one embodiment, the host server 300 is able to poll content sources 310 on behalf of devices 350 to conserve power or battery consumption on devices 350. For example, certain applications on the mobile device 350 can poll its respective server 310 in a predictable recurring fashion. Such recurrence or other types of application behaviors can be tracked by the activity/behavior module 366 in the proxy controller 365. The host server 300 can thus poll content sources 310 for applications on the mobile device 350, that would otherwise be performed by the device 350 through a wireless (e.g., including cellular connectivity). The host server can poll the sources 310 for new, different, updated, or changed data by way of the HTTP access engine 345 to establish HTTP connection or by way of radio controller 396 to connect to the source 310 over the cellular network. When new, different, updated, or changed data is detected, the new data detector can notify the device 350 that such data is available and/or provide the new/changed data to the device 350.

In one embodiment, the connection manager 395 determines that the mobile device 350 is unavailable (e.g., the radio is turned off) and utilizes SMS to transmit content to the device 350, for instance via the SMSC shown in the example of FIG. 1B. SMS may be used to transmit invalidation messages, batches of invalidation messages, or even content in the case the content is small enough to fit into just a few (usually one or two) SMS messages. This avoids the need to access the radio channel to send overhead information. The host server 300 can use SMS for certain transactions or responses having a priority level above a threshold or otherwise meeting a criteria. The server 300 can also utilize SMS as an out-of-band trigger to maintain or wake-up an IP connection as an alternative to maintaining an always-on IP connection.

In one embodiment, the connection manager 395 in the proxy server 325 (e.g., the heartbeat manager 398) can generate and/or transmit heartbeat messages on behalf of connected devices 350, to maintain a backend connection with a provider 310 for applications running on devices 350.

For example, in the distributed proxy system, local cache on the device 350 can prevent any or all heartbeat messages needed to maintain TCP/IP connections required for applications, from being sent over the cellular, or other network, and instead rely on the proxy server 325 on the host server 300 to generate and/or send the heartbeat messages to maintain a connection with the backend (e.g., app server/provider 110 in the example of FIGS. 1A-1B). The proxy server can generate the keep-alive (heartbeat) messages independent of the operations of the local proxy on the mobile device.

The repositories 312, 314, and/or 316 can additionally store software, descriptive data, images, system information, drivers, and/or any other data item utilized by other components of the host server 300 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

FIG. 3B depicts a block diagram illustrating another example of the server-side components of the distributed proxy system shown in the example of FIG. 3A as further including a user experience (UE) enhancement engine 385 and with the traffic shaping engine 375 further including a delay module 378.

The UE enhancement engine 385 may further include an activity prediction engine 386 having a server activity tracker 387, a contextual data tracker 389 and/or a pre-caching engine 390.

The server activity tracker 387 can track the activity or behavior of a server (application server/content provider 110 in the examples of FIG. 1A-1B) for use in predicting data activity at the app server/content provider. The activity/behavior determined by the activity tracker can be used, for example, by the traffic shaping engine 375 in determining a timing with which data received from the server is to be transmitted to a mobile device. In general, the server is a host (e.g., Facebook server, email server, RSS service, any other web services, etc.) with which the mobile device interacts to satisfy content requests/needs.

In general, server activity/behavior can include any action or activity detected on the server for servicing content requests made by an associated application, service, or account on a device (e.g., device 250 in the example of FIG. 2A). Server activity can include, for example, amount of impending data to be transferred to the mobile device, last-accessed time or a frequency of access, etc.

Determined or detected server activity can be used in determining a timing with which to transfer impending data from the host server. For example, if the activity tracker 387 detects that a recent data transfer was made from the Facebook server to the device, the traffic shaping engine 375, may delay the time (e.g., via the delay module 378) with which the next data transfer is to be made, for example, based on predicted future activity session. Alternatively, in response to determining that a large amount of data is impending at the host to be sent to the mobile device, the traffic shaping engine 375 may decide to initiate a transfer without delay or with minimal delay.

One embodiment of the activity prediction engine 386 further includes a contextual data tracker 389 to detect contextual data for use in the anticipation of future activity session(s). Contextual data can be used alone or in conjunction with server activity by the prediction engine 386 in anticipating future activity sessions (e.g., future activity, future data events/transactions at a content host/app server/provider).

Contextual data can include, for example, location changes or motion of a mobile device, states or statuses of applications on the mobile device (e.g., if the application is active or inactive, running in the foreground or background, if a user is actively interacting with the application or if background maintenance processes are running, etc.). Contextual data can be determined from one or more hardware sensors on a device, for example, device backlight, a device electronic compass, motion sensor, tilt sensor, light sensor, gesture sensor, input detector (keyboard, mouse, touch screen), proximity sensor, capacitive sensor, resistive sensor, image detector, a camera, GPS receiver, etc.

In one embodiment, the traffic shaping engine 375 can categorize the activity that is being processed by the host server 300 since the last user activity session. Predicted or anticipated activity sessions which can be generated by the activity prediction engine 386 can include:

1) A list of URLs representing application servers/content providers (e.g., the provider/server 110 of FIGS. 1A-1B);

2) For each URL, a count of impending data that is available to the user for that URL to be transmitted to the device;

3) For each URL, a last-accessed time and/or a frequency of access.

Once created, the traffic shaping engine 375 can prioritize the app servers/content providers (or the representing URLs) based on last accessed time, frequency, impending data count, or other criteria to form a prioritized list of host URL targets. This predicted or anticipated activity session may form the basis for predicting whether a subsequent mobile device data request will activate the session (i.e., turn the predicted activity session into an activity session).

The predicted activity session can be used by the traffic shaping engine 375 to determining a timing with which to transfer impending data from the host server to the mobile device to support predicted data activity for the future activity session. In one embodiment, transfer of the impending content is performed over a multiplexed TCP connection supporting multiple HTTP sessions. In some instances, the impending content is transferred from the host server the mobile device to pre-cache content (e.g., by the pre-caching module 390) on the mobile device to support predicted data activity for the future activity session. The pre-caching can enhance a user's experience since the data is provided to the user before it is actually requested (e.g., in the predicted activity session).

Figure 4A:
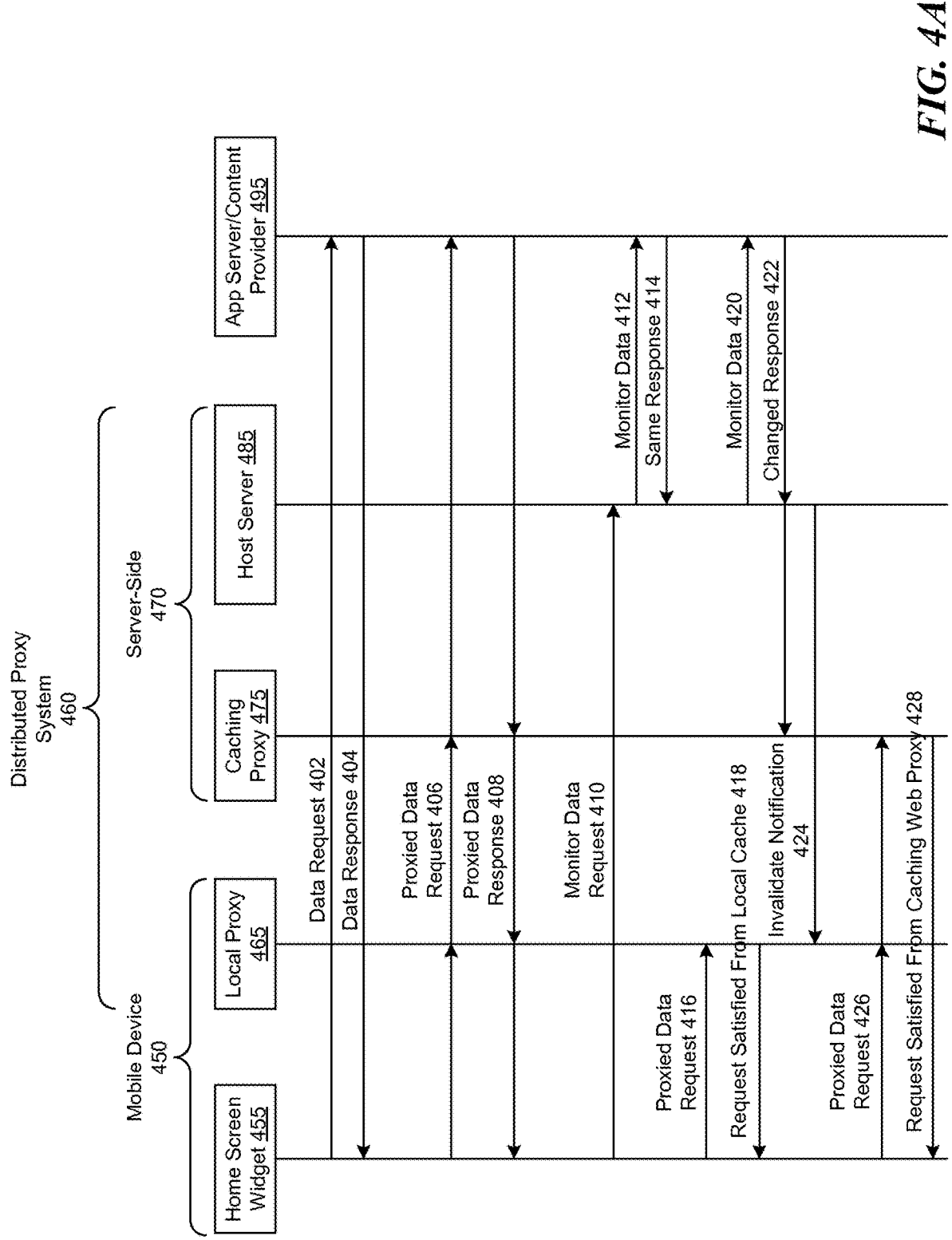
FIG. 4A depicts a timing diagram showing how data requests from a mobile device to an application server/content provider in a wireless network can be coordinated by a distributed proxy system in a manner such that network and battery resources are conserved through using content caching and monitoring performed by the distributed proxy system.

FIG. 4A depicts a diagram showing how data requests from a mobile device 450 to an application server/content provider 496 in a wireless network can be coordinated by a distributed proxy system 460 in a manner such that network and battery resources are conserved through using content caching and monitoring performed by the distributed proxy system 460.

In satisfying application or client requests on a mobile device 450 without the distributed proxy system 460, the mobile device 450, or the software widget executing on the device 450 performs a data request 402 (e.g., an HTTP GET, POST, or other request) directly to the application server 495 and receives a response 404 directly from the server/provider 495. If the data has been updated, the widget on the mobile device 450 can refreshes itself to reflect the update and waits for small period of time and initiates another data request to the server/provider 495.

In one embodiment, the requesting client or software widget 455 on the device 450 can utilize the distributed proxy system 460 in handling the data request made to server/provider 495. In general, the distributed proxy system 460 can include a local proxy 465 (which is typically considered a client-side component of the system 460 and can reside on the mobile device 450), a caching proxy (475, considered a server-side component 470 of the system 460 and can reside on the host server 485 or be wholly or partially external to the host server 485), a host server 485. The local proxy 465 can be connected to the proxy 475 and host server 485 via any network or combination of networks.

When the distributed proxy system 460 is used for data/application requests, the widget 455 can perform the data request 406 via the local proxy 465. The local proxy 465, can intercept the requests made by device applications, and can identify the connection type of the request (e.g., an HTTP get request or other types of requests). The local proxy 465 can then query the local cache for any previous information about the request (e.g., to determine whether a locally stored response is available and/or still valid). If a locally stored response is not available or if there is an invalid response stored, the local proxy 465 can update or store information about the request, the time it was made, and any additional data, in the local cache. The information can be updated for use in potentially satisfying subsequent requests.

The local proxy 465 can then send the request to the host server 485 and the server 485 can perform the request 406 and returns the results in response 408. The local proxy 465 can store the result and in addition, information about the result and returns the result to the requesting widget 455.

In one embodiment, if the same request has occurred multiple times (within a certain time period) and it has often yielded same results, the local proxy 465 can notify 410 the server 485 that the request should be monitored (e.g., steps 412 and 414) for result changes prior to returning a result to the local proxy 465 or requesting widget 455.

In one embodiment, if a request is marked for monitoring, the local proxy 465 can now store the results into the local cache. Now, when the data request 416, for which a locally response is available, is made by the widget 455 and intercepted at the local proxy 465, the proxy 465 can return the response 418 from the local cache without needing to establish a connection communication over the wireless network. In one embodiment, the response is stored at the server proxy in the server cache for subsequent use in satisfying same or similar data requests. The response can be stored in lieu of or in addition to storage on the local cache on the mobile device.

In addition, the server proxy performs the requests marked for monitoring 420 to determine whether the response 422 for the given request has changed. In general, the host server 485 can perform this monitoring independently of the widget 455 or local proxy 465 operations. Whenever an unexpected response 422 is received for a request, the server 485 can notify the local proxy 465 that the response has changed (e.g., the invalidate notification in step 424) and that the locally stored response on the client should be erased or replaced with a new (e.g., changed or different) response.

In this case, a subsequent data request 426 by the widget 455 from the device 450 results in the data being returned from host server 485 (e.g., via the caching proxy 475). Thus, through utilizing the distributed proxy system 460 the wireless (cellular) network is intelligently used when the content/data for the widget or software application 455 on the mobile device 450 has actually changed. As such, the traffic needed to check for the changes to application data is not performed over the wireless (cellular) network. This reduces the amount of generated network traffic and shortens the total time and the number of times the radio module is powered up on the mobile device 450, thus reducing battery consumption, and in addition, frees up network bandwidth.

Figure 4B:
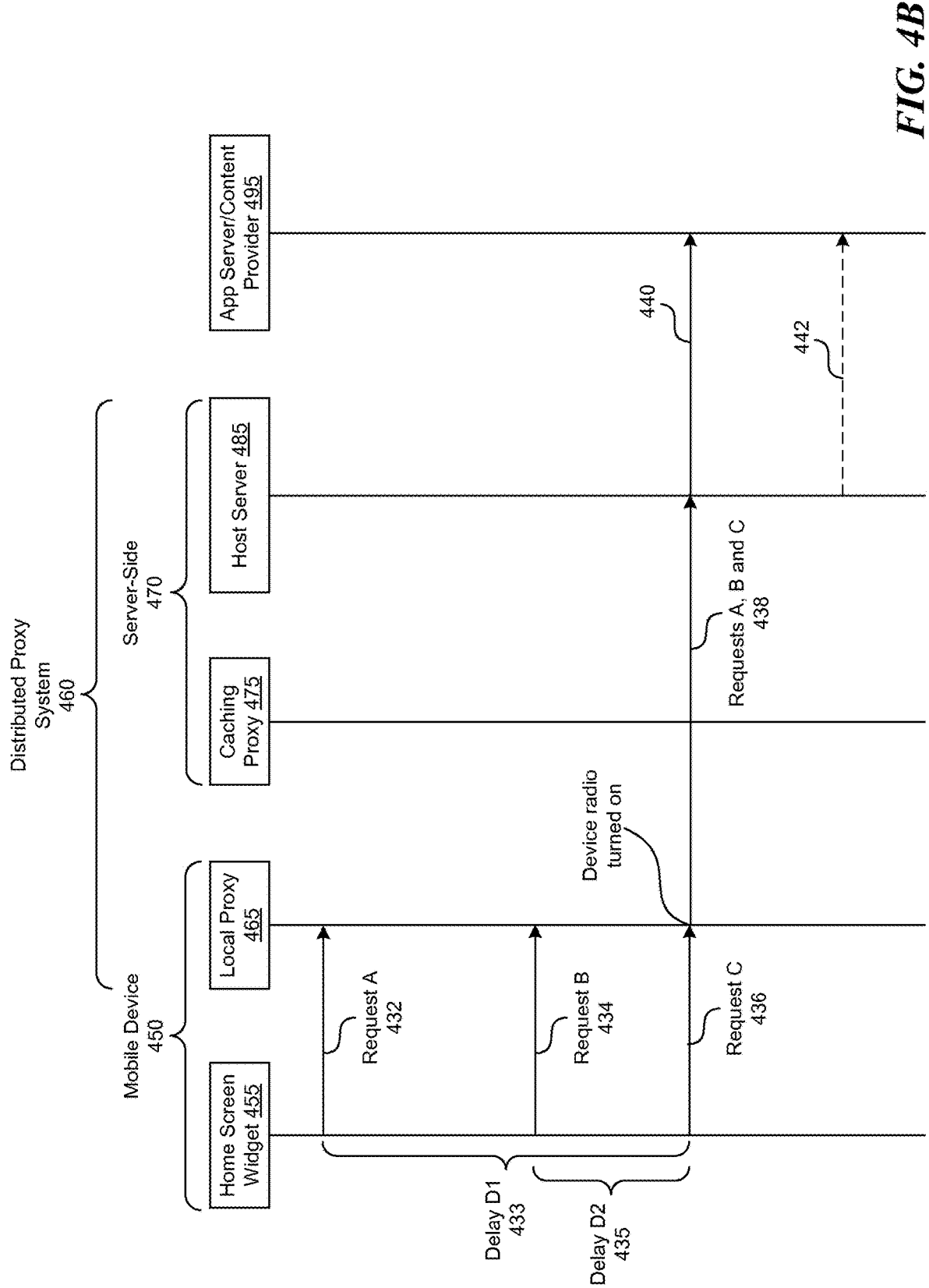
FIG. 4B depicts a timing diagram showing how data requests from a mobile device to an application server/content provider in a wireless network can be aligned at the local proxy in the distributed proxy system to optimize network and radio use.

FIG. 4B depicts a timing diagram showing how data requests from a mobile device 450 to an application server/content provider 495 in a wireless network can be aligned at the local proxy 465 in the distributed proxy system 460 to optimize network and radio use.

When a data request A 432 is detected at the local proxy 465 on the mobile device 450, the local proxy 465 can determine that the radio on the mobile device 450 is currently off and decide to wait to transfer the request A 432 over the network. When data request B 434 is detected, the proxy 465 can determine (e.g., based on conditions and/or processes illustrated in the flow charts in the examples of FIGS. 6A-10C) whether to transfer the data request B 434 and/or whether also to transfer the impending data request A 432.

In the example shown in FIG. 4B, the local proxy 465 does not transfer data requests A and B until data request C 436 is detected at the device 450 by the proxy 465. The time 'D1' 433 with which request A 432 and time D2' 435 with which request B 434 are delayed, can be determined by the local proxy 465 (e.g., as described in conjunction with the traffic shaping module and delay module in the example of FIG. 2B). The radio can be turned on when request C 436 is received and data transfers for requests A, B, and C 438 can be aligned at this point to be transferred to the host server 480 on the server-side 470 of the distributed proxy 460 which can forward the request to the server/provider 495, immediately in transfer 440, or possibly with some delay, in transfer 442. Note that the data requests A, B, and C can all originate from the same application or different applications on the mobile device 450.

Figure 5:
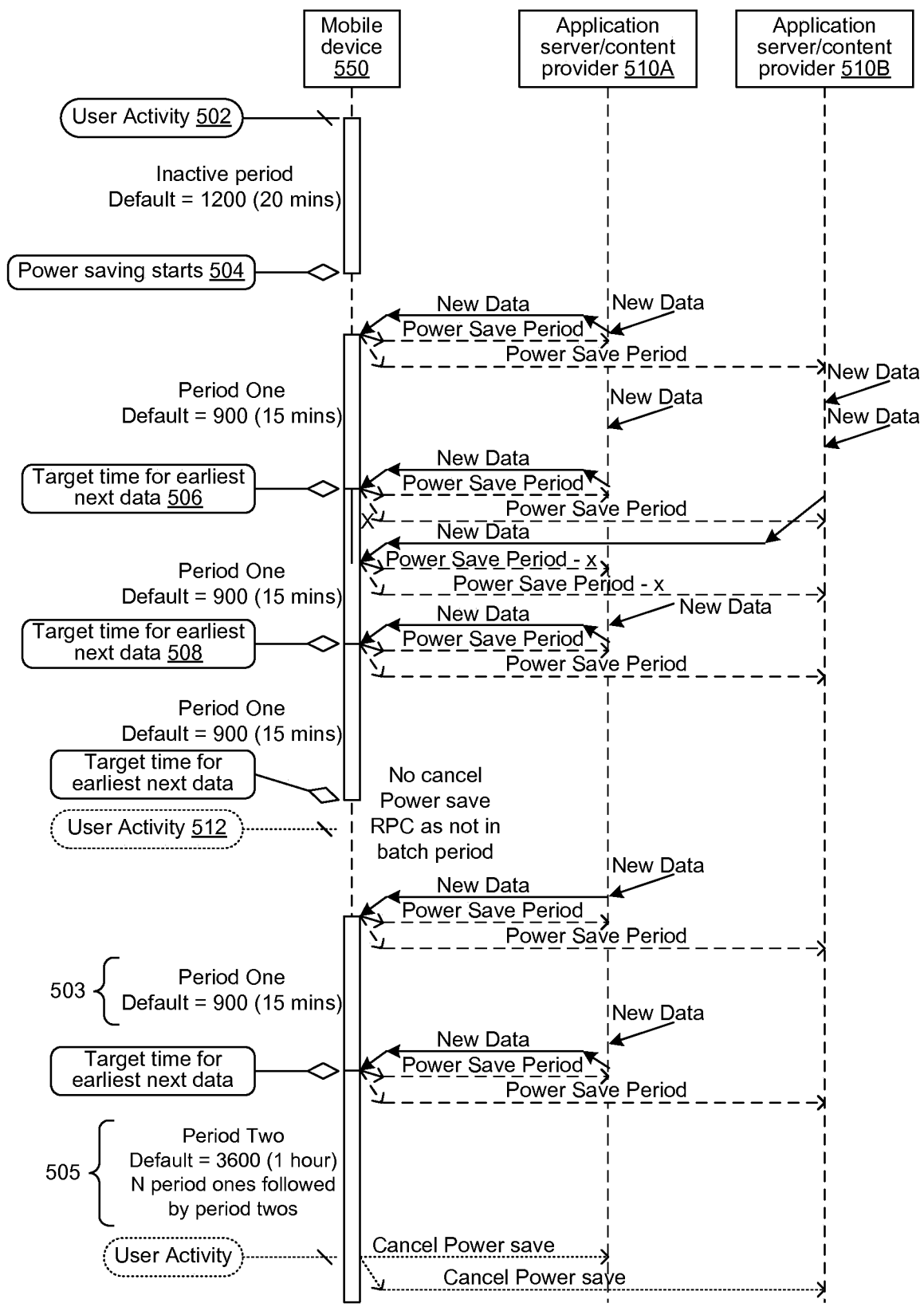
FIG. 5 depicts a diagram showing one example process for implementing a hybrid IP and SMS power saving mode on a mobile device using a distributed proxy and cache system (e.g., such as the distributed system shown in the example of FIG. 1B).

FIG. 5 depicts a diagram showing one example process for implementing a hybrid IP and SMS power saving mode on a mobile device 550 using a distributed proxy and cache system (e.g., such as the distributed system shown in the example of FIG. 1B).

In step 502, the local proxy (e.g., proxy 175 in the example of FIG. 1B) monitors the device for user activity. When the user is determined to be active, server push is active. For example, always-on-push IP connection can be maintained and if available, SMS triggers can be immediately sent to the mobile device 550 as it becomes available.

In process 504, after the user has been detected to be inactive or idle over a period of time (e.g., the example is shown for a period of inactivity of 20 min.), the local proxy can adjust the device to go into the power saving mode. In the power saving mode, when the local proxy receives a message or a correspondence from a remote proxy (e.g., the server proxy 135 in the example of FIG. 1B) on the server-side of the distributed proxy and cache system, the local proxy can respond with a call indicating that the device 550 is currently in power save mode (e.g., via a power save remote procedure call). In some instances, the local proxy take the opportunity to notify multiple accounts or providers (e.g., 510A, and 510B) of the current power save status (e.g., timed to use the same radio power-on event).

In one embodiment, the response from the local proxy can include a time (e.g., the power save period) indicating to the remote proxy (e.g., server proxy 135) and/or the app server/providers 510A/B when the device 550 is next able to receive changes or additional data. A default power savings period can be set by the local proxy. Consecutive power saving periods can increase in duration. For example, if a first power saving period has elapsed without an activity occurring, the device 550 can continue into a second power saving mode with a longer time period (e.g., see periods one 503 and period two 505). In general, any activity on the device takes the client out of power saving mode and ends that particular power save event.

In one embodiment, if new, change, or different data or event is received before the end of any one power saving period, then the wait period communicated to the servers 510A/B can be the existing period, rather than an incremented time period. For example, in step 506, since new content was received during the power saving mode, the next wait period communicated in step 508 to servers 510A/B may again be the same time saving period. In response, the remote proxy server, upon receipt of power save notification from the device 550, can stop sending changes (data or SMSs) for the period of time requested (the wait period). At the end of the wait period, any notifications received can be acted upon and changes sent to the device 550, for example, as a single batched event or as individual events. If no notifications come in, then true push can be resumed with the data or an SMS being sent immediately to the device 550. To optimize batch sending content to the mobile device 550, the proxy server can start the poll or data collect event earlier (before the end of a power save period) in order to increase the chance that the client will receive data at the next radio power on event.

In one embodiment, whenever new data or content comes into the device 550 while it is in a power saving mode, it can respond with the power saving remote procedure call to all end points currently registered (e.g., server/providers 510A/B). Note that the wait period can be updated in operation in real time to accommodate operating conditions. For example, as the mobile device 550 sends additional power saving calls (e.g., with updated wait times) if multiple servers 510A/B or others, respond to the end of a wait period with different delays, the local proxy can adjust the wait period on the fly to accommodate the different delays.

Detection of user activity 512 at the device 550 causes the power save mode to be exited. When the device 550 exits power save mode, it can send power save cancel call to the proxy server and immediately receives any changes associated with any pending notifications. This may require a poll to be run by the proxy server after receiving the power saving cancel call. If the latest power saving period has expired, then no power save cancel call may be needed as the proxy server will already be in traditional push operation mode.

In one embodiment, power save mode is not applied when the device 550 is plugged into a charger. This setting can be reconfigured or adjusted by the user or another party. In general, the power save mode can be turned on and off, for example, by the user via a user interface on device 550. In general, timing of power events to receive data can be synced with any power save calls to optimize radio use.

Figure 6A:
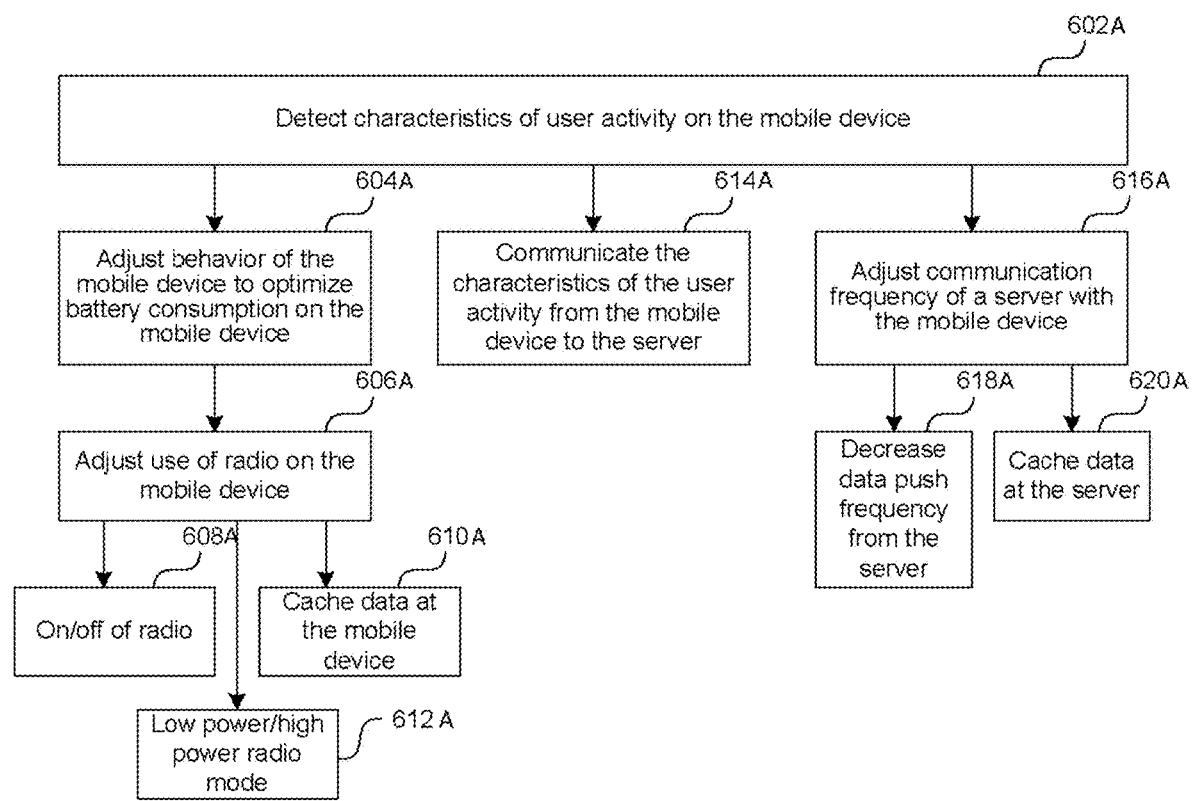
FIG. 6A depicts a flow chart illustrating example processes through which context awareness is used for traffic management.

FIG. 6A depicts a flow chart illustrating example processes through which context awareness is used for traffic management.

In process 602A, characteristics of user activity on the mobile device are detected. In process 604A, behavior of the mobile device is adjusted to optimize battery consumption on the mobile device. The adjustment of the behavior of the mobile device can include, for example, adjusting the use of radio on the mobile device, as in process 606A. In addition, in process 608A, the radio can be switched on/off. Further, the radio can also be placed in low power or high power radio mode in process 612A.

In addition, data can be cached at the mobile device in process 610A to adjust radio use. Data may also be cached at the server in wireless communication with the mobile device to in order to modify communication frequency with the mobile device. In one embodiment, in response to detection of user activities on the mobile device, the characteristics of the user activity can be communicated from the mobile device to the server, in process 614A.

Similarly, based on the user activity characteristics, communication frequency of a server with the mobile device can be adjusted in process 616A. For example, data push frequency from the server to the mobile device is decreased, in process 618A. Similarly, data can be cached at the server in process 620A to adjust communication frequency.

In addition, characteristics of transactions occurring at the mobile device can also be used to locally adjust radio use on the mobile device. For example, characteristics of transactions include time criticality of the transactions and that a low power radio mode or a high power radio mode can be selected for use on the mobile device based on the time criticality of the transactions. Additionally, a low power radio mode or a high power radio mode is selected for use on the mobile device based on amount of data to be transferred in the transactions.

Figure 6B:
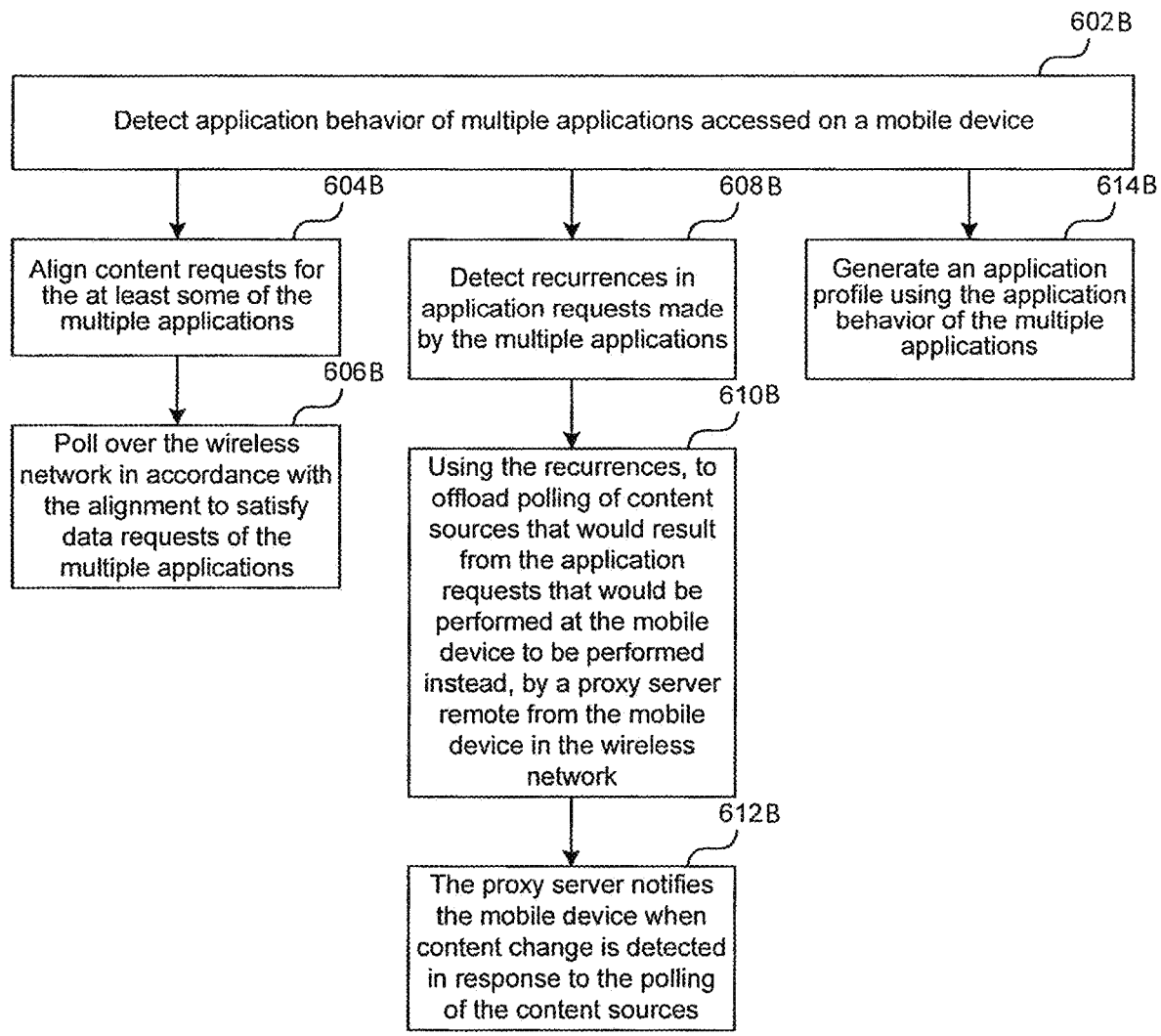
FIG. 6B depicts a flow chart illustrating example processes through which application behavior on a mobile device is used for traffic optimization.

FIG. 6B depicts a flow chart illustrating example processes through which application behavior on a mobile device is used for traffic optimization.

In process 602B, application behavior of multiple applications accessed on a mobile device is detected. Using application behavior, the distributed proxy system can implement one or more of several processes for optimizing traffic.

For example, beginning in process 604B, content requests for the at least some of the multiple applications are aligned and polling can be performed over the wireless network in accordance with the alignment to satisfy data requests of the multiple applications, in process 606B. In one embodiment, content requests for some of the multiple applications can be aligned based on content types requested by the multiple applications. For example, content requests from different applications requesting RSS feeds can be aligned. In addition, content requests from different applications requesting content from the same sources may be aligned (e.g., a social networking application and a web page may both be requesting media content from an online video streaming site such as Youtube). In another example, multiple Facebook applications on one device (one from OEM, one from marketplace) that both poll for same data.

In addition, content requests can be aligned based on user's explicit and/or implicit preferences, user settings, mobile device parameters/parameters, and/or network parameters (e.g., network service provider specifications or limitations, etc.) or conditions (e.g., traffic, congestion, network outage, etc.). For example, when congestion is detected in a user's network service area, content requests can be aligned for the network is less congested. For example, when user is inactive, or when the battery is low, alignment may be performed more aggressively.

In some instances, the polling can be performed by the proxy server on behalf of multiple devices and can thus detect requests for polls from the same content source from multiple devices. The proxy server, can align such requests occurring around the same time (e.g., within a specific time period) for multiple devices and perform a poll of the source to satisfy the data needs of the multiple mobile devices. For example, during the Superbowl, the proxy server can detect a larger number of requests to poll ESPN.com or NFL.com for live score updates for the game. The proxy server can poll the content source once for a current score and provide the updates to each of the mobile devices that have applications which have (within a time period) requested polls for score updates.

In another example, beginning in process 608B, recurrences in application requests made by the multiple applications are detected. Recurrences of application behavior can be identified by, for example, tracking patterns in application behavior.

Using the recurrences, polling of content sources as a result of the application requests that would be performed at the mobile device can now be offloaded, to be performed instead, for example, by a proxy server remote from the mobile device in the wireless network, in process 610B. The application behavior can be tracked by, for example, a local proxy on the mobile device and communicated to the proxy server as connection metadata, for use in polling the content sources. The local proxy can delays or modifies data prior to transmission to the proxy serve and can additionally identify and retrieve mobile device properties including, one or more of, battery level, network that the device is registered on, radio state, whether the mobile device is being used. The offloading to the proxy server can be performed, for example, when the recurrences match a rule or criteria. In addition, the proxy server and/or the local proxy can delay the delivery of a response received from a content source and/or perform additional modification, etc. For example, the local proxy can delay the presentation of the response via the mobile device to the user, in some instances.

Patterns of behavior can include, one or more of, by way of example but not limitation, frequency that requested content is the same, frequency with which a same request is made, interval between requests, applications making a request, frequency of requests at certain times of day, day of week. In addition, multi-application traffic patterns can also be detected and tracked.

In process 612B, the proxy server can notify the mobile device when content change is detected in response to the polling of the content sources. In one embodiment, cached content, when available, can be provided to satisfy application requests when content change is not detected in the polling of the content sources. For example, the local proxy can include a local cache and can satisfy application requests on the mobile device using cached content stored in the local cache. In one embodiment, the decision to use cached content versus requesting data from the content source is determined based on the patterns in application behavior. In addition, an application profile can be generated, using the application behavior of the multiple applications, in process 614B.

Figure 7A:
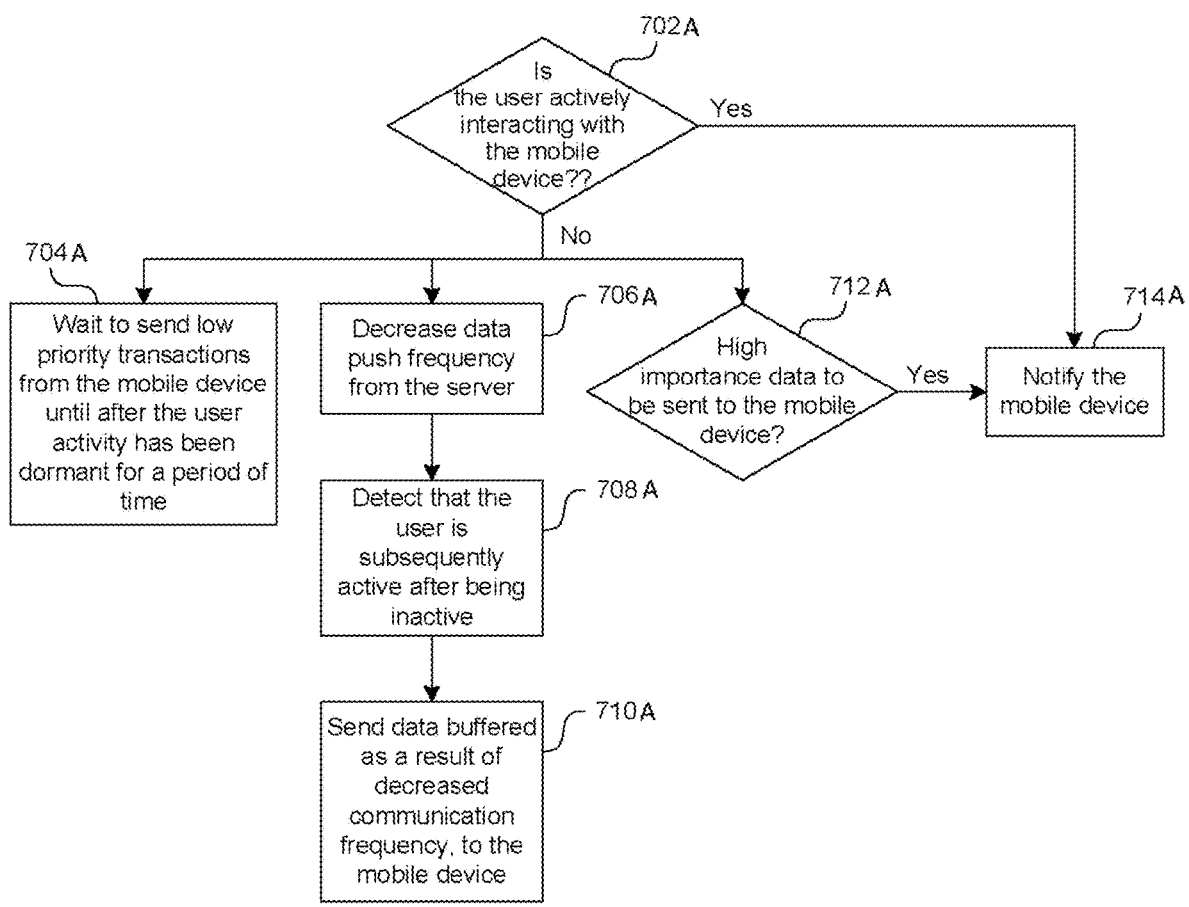
FIG. 7A depicts a flow chart illustrating an example process for managing traffic in a wireless network based on user interaction with a mobile device.

FIG. 7A depicts a flow chart illustrating an example process for managing traffic in a wireless network based on user interaction with a mobile device.

In process 702A, it is determined if the user actively interacting with the mobile device. If the user is actively interacting with the mobile device, the mobile device 714A can be notified, as in process 714A, of new data or changes in data.

If not, in process 704A, device can wait to send low priority transactions until after the user activity has been dormant for a period of time, for example, low priority transactions include, one or more of, updating message status as being read, unread, and deleting of messages. In addition, low priority transactions can be sent when a higher priority transaction needs to be sent, thus utilizing the same radio power-up event. Low priority transactions can generally include application maintenance events, events not requested by a user, events scheduled to be in the future, such as, by way of example but not limitation, one or more of, updating message status as being read, unread, and deleting of messages.

Similarly, if the user is not active, data push frequency from the server can be decreased in process 706A. In process 708A, if the user is detected to be subsequently active after being inactive, then data buffered as a result of decreased communication frequency can be sent to the mobile device, in process 710A.

Alternatively, even if the user is not actively interacting with the mobile device, an assessment can be made as to whether high importance data (e.g., data importance or priority meeting a threshold level) is pending to be sent to the mobile device, in process 712A. If so, the mobile device is notified, in process 714A. As a result of the notification, the mobile device radio can be enabled such that the high importance data can be sent to the mobile device. In general, the importance of data can be determined based on one or more of several criteria including but not limited to, application to which the data is relevant, time criticality, and time sensitivity, etc. An example of a time critical transaction includes a transaction resulting from a user-initiated data transfer.

Figure 7B:
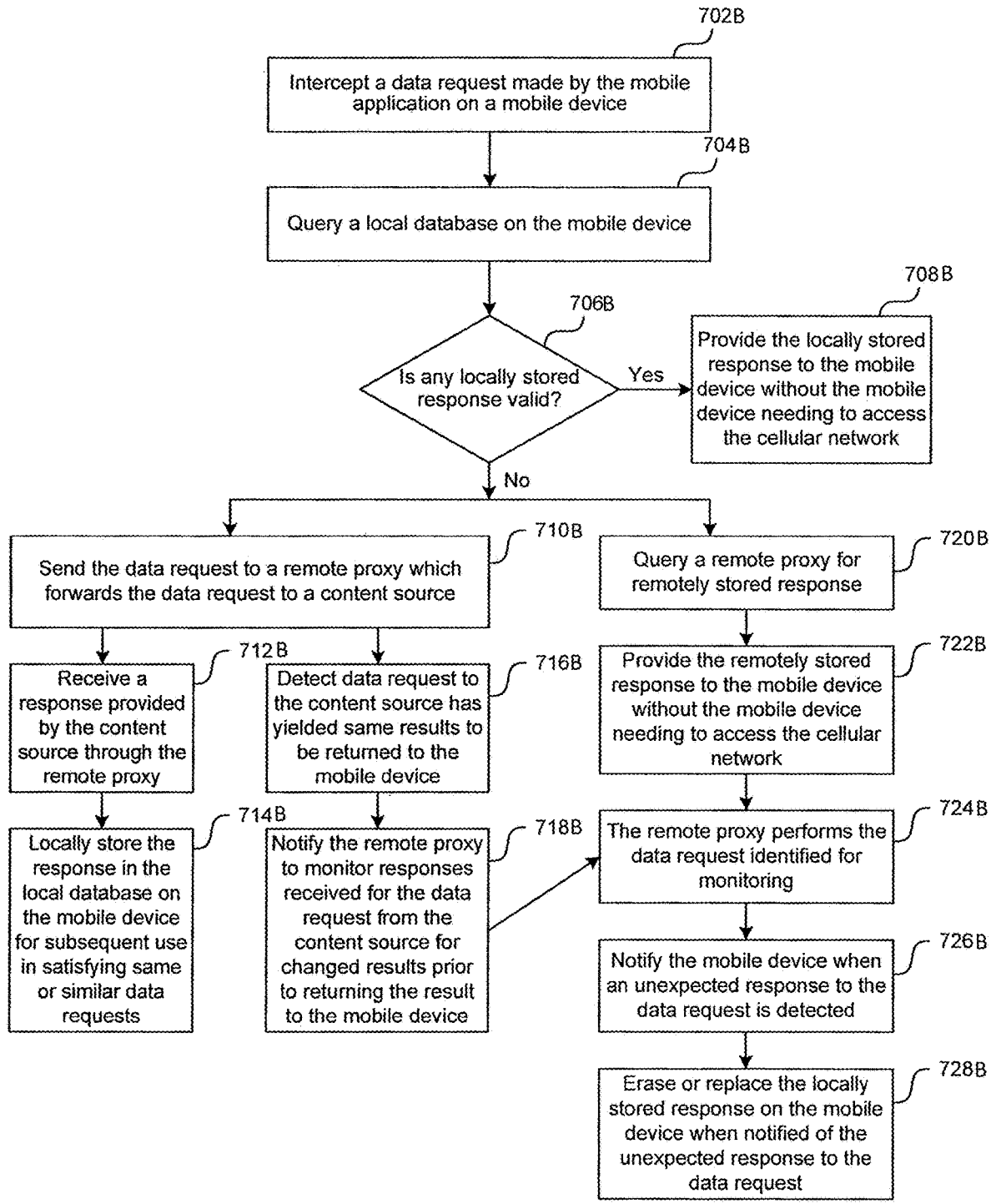
FIG. 7B depicts a flow chart illustrating an example process for mobile application traffic optimization through data monitoring and coordination in a distributed proxy and cache system.

FIG. 7B depicts a flow chart illustrating an example process for mobile application traffic optimization through data monitoring and coordination in a distributed proxy and cache system.

In process 702B, a data request made by the mobile application on a mobile device is intercepted. In process 704B, a local cache on the mobile device is queried.

In process 706B, it is determined whether a locally stored valid response exists (e.g., whether a locally stored response is available and if so, if the stored response is still valid. If so, in process 708B, the locally stored response to the mobile device without the mobile device needing to access the cellular network If not, a locally stored response is not available, or available but invalid, one or more of several approaches may be taken to optimize the traffic used in the wireless network for satisfying this request, as will be described below.

In one example, in process 710B, the data request is sent to a remote proxy which forwards the data request to a content source. In general, the remote proxy can delay or modify data from the local proxy prior to transmission to the content sources. In one embodiment, the proxy server can use device properties and/or connection metadata to generate rules for satisfying request of applications on the mobile device. In addition, the proxy server can optionally gather real time traffic information about requests of applications for later use in optimizing similar connections with the mobile device or other mobile devices.

In process 712B, a response provided by the content source is received through the remote proxy. In one embodiment, the remote proxy can simulate an application server authentication and querying a local cache on the mobile device to retrieve connection information if available or needed to connect to the content source. Upon authentication application server responses for the mobile application can be simulated by the remote proxy on the mobile device for data requests where responses are available in the local cache.

In process 714B, the response is locally stored as cache entries in a local repository on the mobile device. The local cache entries can be stored for subsequent use in satisfying same or similar data request.

In addition, in process 716B, data request to the content source is detected to yielded same results to be returned to the mobile device (e.g., detected by the local proxy on the mobile device). In response to such detection, the remote proxy is notified to monitor responses received for the data request from the content source for changed results prior to returning the result to the mobile device. In one embodiment, the local proxy can store the response as a cache entry in the local cache for the data request when the remote proxy is notified to monitor the responses for the data request.

In process 722B, the remote proxy performs the data request identified for monitoring and notifies the mobile device when an unexpected response to the data request is detected. In process 724B. The locally stored response on the mobile device is erased or replaced when notified of the unexpected response to the data request.

In another example, when a locally stored response is not available or otherwise invalid, in process 718B, a remote proxy is queried for a remotely stored response. In process 720B, the remotely stored response is provided to the mobile device without the mobile device needing to access the cellular network. In process 722B, the remote proxy performs the data request identified for monitoring and notifies the mobile device when an unexpected response to the data request is detected. In process 724B, the locally stored response on the mobile device is erased or replaced when notified of the unexpected response to the data request.

Figure 8A:
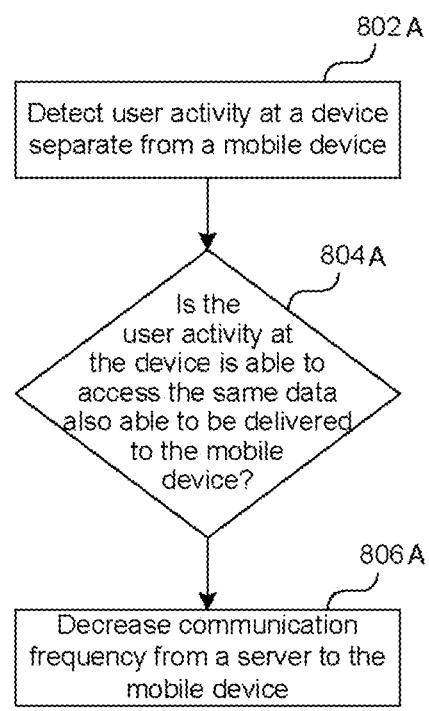
FIG. 8A depicts a flow chart illustrating another example process for managing traffic in a wireless network based on user interaction with a mobile device.

FIG. 8A depicts a flow chart illustrating another example process for managing traffic in a wireless network based on user interaction with a mobile device.

In process 802A, user activity is detected at a device separate from a mobile device. In process 804A, it is determined whether the user activity at the device is able to access the same data, content, or application, which is also setup to be delivered to or accessed at the mobile device. For example, user activity at the device separate from the mobile device can include user access of an email inbox or other types applications via an interface other than that accessed from the mobile device (e.g., from a laptop or desktop computer). Since the user is now accessing the client from another device, the user now may not need content to be updated as frequently on the mobile device. Thus, in process 806A, communication frequency from a server to the mobile device is decreased.

Figure 8B:
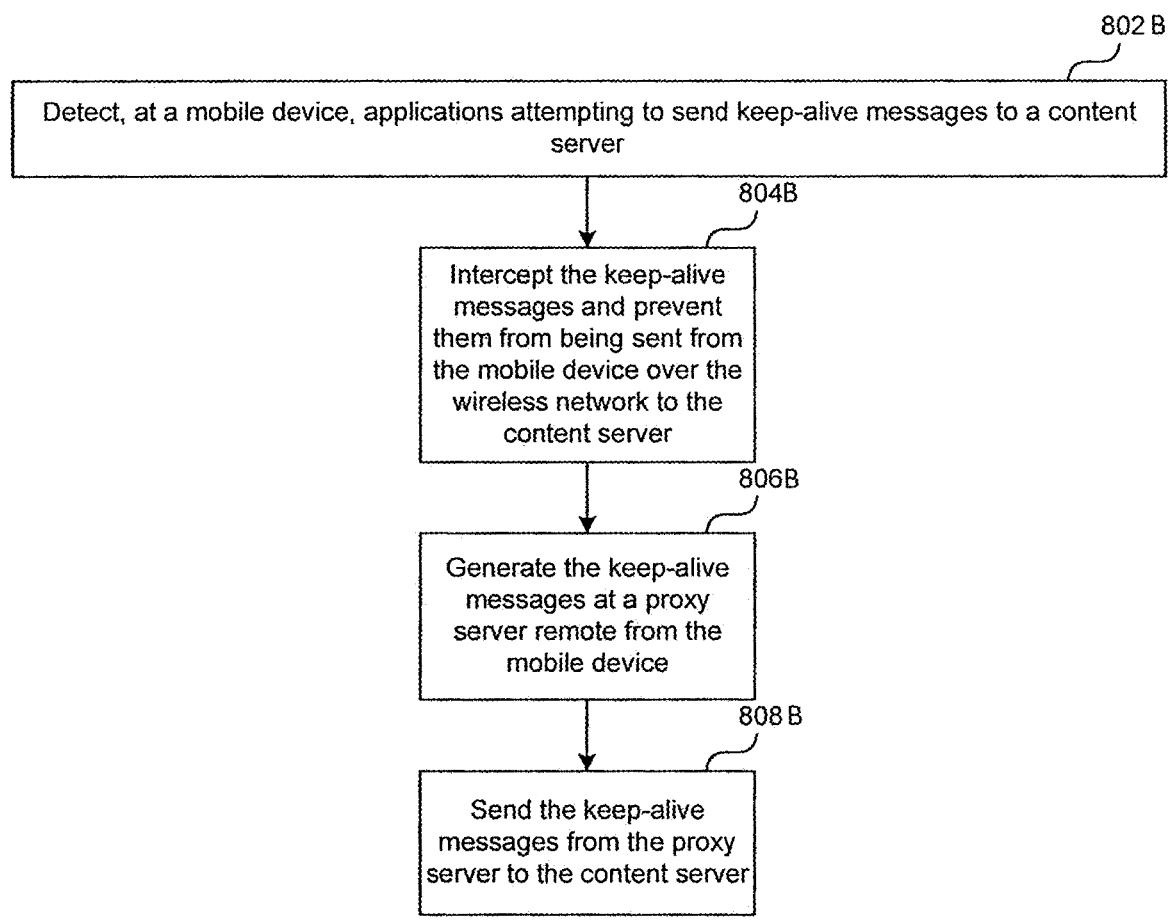
FIG. 8B depicts a flow chart illustrating an example process for preventing applications from needing to send keep-alive messages to maintain an IP connection with a content server.

FIG. 8B depicts a flow chart illustrating an example process for preventing applications from needing to send keep-alive messages to maintain an IP connection with a content server.

In process 802B, applications attempting to send keep-alive messages to a content server are detected at a mobile device.

In process 804B, the keep-alive messages are intercepted and prevented from being sent from the mobile device over the wireless network to the content server. Since keep-alives are similar to any other (long-poll) requests—the content on the back end typically does not change and the proxy server can keep polling the content server.

In process 806B, the keep-alive messages are generated at a proxy server remote from the mobile device and sent from the proxy server to the content server, in process 808B.

Figure 9A:
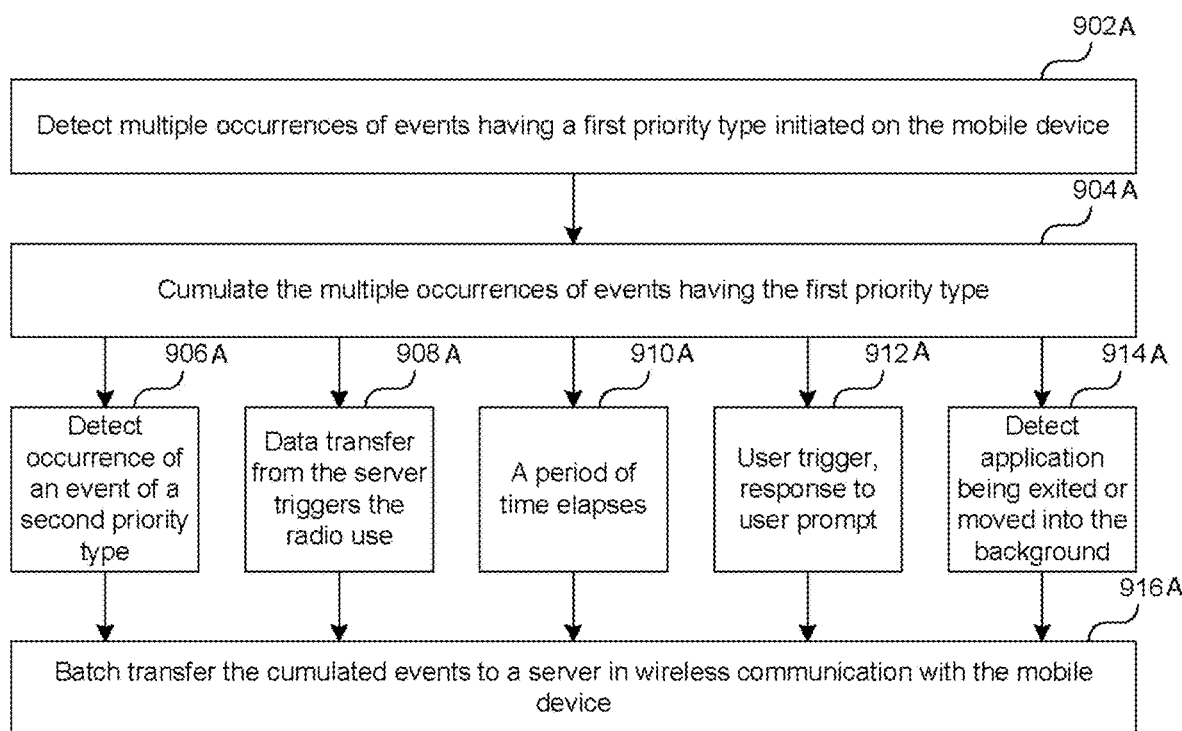
FIG. 9A depicts a flow chart illustrating an example process for managing traffic initiated from a mobile device in a wireless network through batching of event transfer based on event priority.

FIG. 9A depicts a flow chart illustrating an example process for managing traffic initiated from a mobile device in a wireless network through batching of event transfer based on event priority.

In process 902A, multiple occurrences of events having a first priority type initiated on the mobile device are detected.

In process 904A, the mobile device cumulates multiple occurrences of events having a first priority type initiated on the mobile device, before transfer over the wireless network. The first priority type can be a generally low priority type indicating a request or update which is not time critical or time sensitive. Thus, if the device radio is currently off, the radio may not be immediately turned on to transmit individual events which are not time critical, until other triggering events occur or other criteria is met.

For example, in process 906A, occurrence of an event of a second priority type is detected, which can trigger batch transfer of the cumulated events to a server in wireless communication with the mobile device, in process 916A, where the second priority type is of a higher priority than the first priority type.

In another example, in process 908A, data transfer from the server can trigger the radio use on the mobile device, which can trigger batch transfer of the cumulated events to a server in wireless communication with the mobile device, in process 916A. Alternatively, in process 910A, after a period of time elapses, batch transfer of the cumulated events to a server in wireless communication with the mobile device can be triggered, in process 916A.

In one embodiment, in process 912A, a user trigger (e.g., a manual sync request) or in response to a user prompt, batch transfer of the cumulated events to a server in wireless communication with the mobile device can be triggered, in process 916A. In process 914A, when it is detected that an application is exited and/or moved into the background, batch transfer of the cumulated events to a server in wireless communication with the mobile device can be triggered, in process 916A.

Figure 10A:
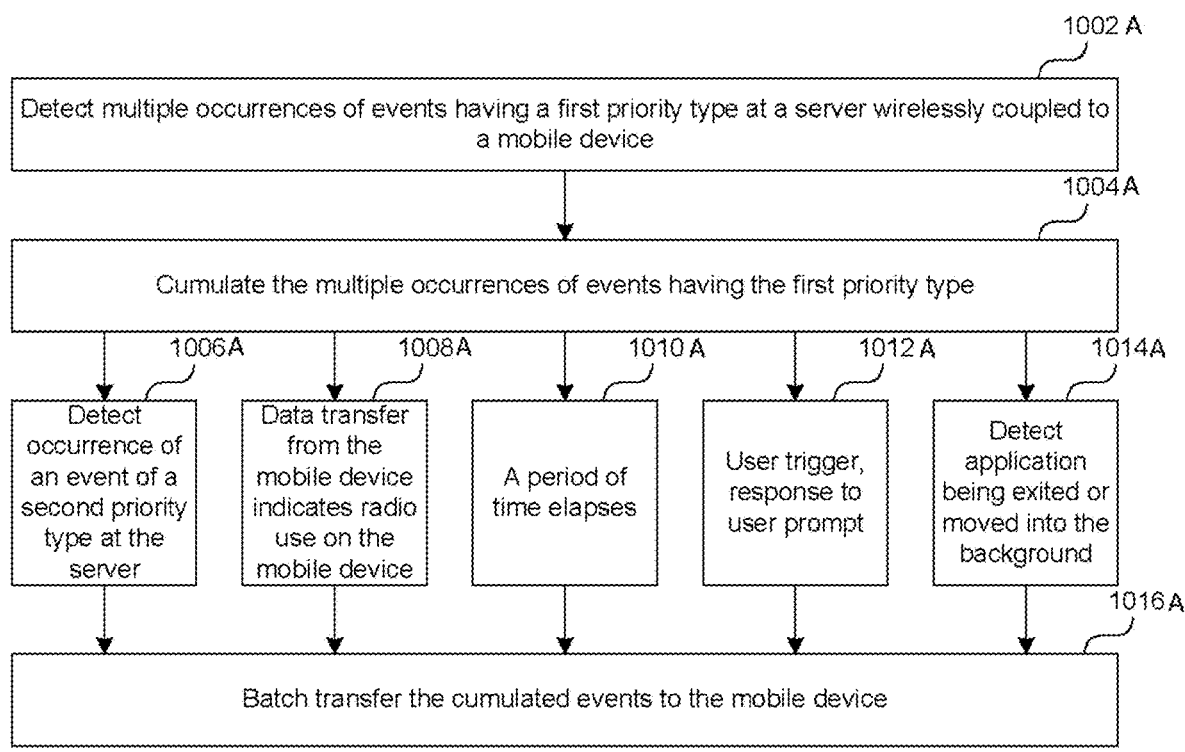
FIG. 10A depicts a flow chart illustrating another example process for managing traffic initiated remotely from a mobile device in a wireless network through batching of event transfer based on event priority.

FIG. 10A depicts a flow chart illustrating another example process for managing traffic initiated remotely from a mobile device in a wireless network through batching of event transfer based on event priority.

In process 1002A, multiple occurrences of events having a first priority type are detected at a server wirelessly coupled to a mobile device. In process 1004A, the server cumulates the multiple occurrences of events having a first priority type, before transfer over the wireless network. The first priority type may not be of a high priority type or having a priority exceeding a certain threshold level indicating a level or time criticality or urgency. Thus, such events, upon occurrence, may not be immediately transferred to the mobile device, until certain criterion is met, or until one or more triggering events occur.

For example, in process 1006A, occurrence of an event of a second priority type is detected at the server, which can trigger batch transfer of the cumulated events to the mobile device, in process 1016A, when the second priority type is of a higher priority than the first priority type. In another example, in process 1008A, data transfer from the mobile device indicates the radio use on the mobile device, which can trigger batch transfer of the cumulated events to the mobile device, in process 1016A.

Alternatively, in process 1010A, after a period of time elapses, batch transfer of the cumulated events to the mobile device can be triggered, in process 1016A. In process 1012A, a user trigger or in response to a user prompt, batch transfer of the cumulated events to the mobile device can be triggered, in process 1016A. In process 1014A, when it is detected that an application is exited and/or moved into the background, batch transfer of the cumulated events to the mobile device can be triggered, in process 1016A. In general, manual overrides or manual syncs can cause batch transfers to occur, either from the mobile device to the server or vice versa.

Figure 6C:
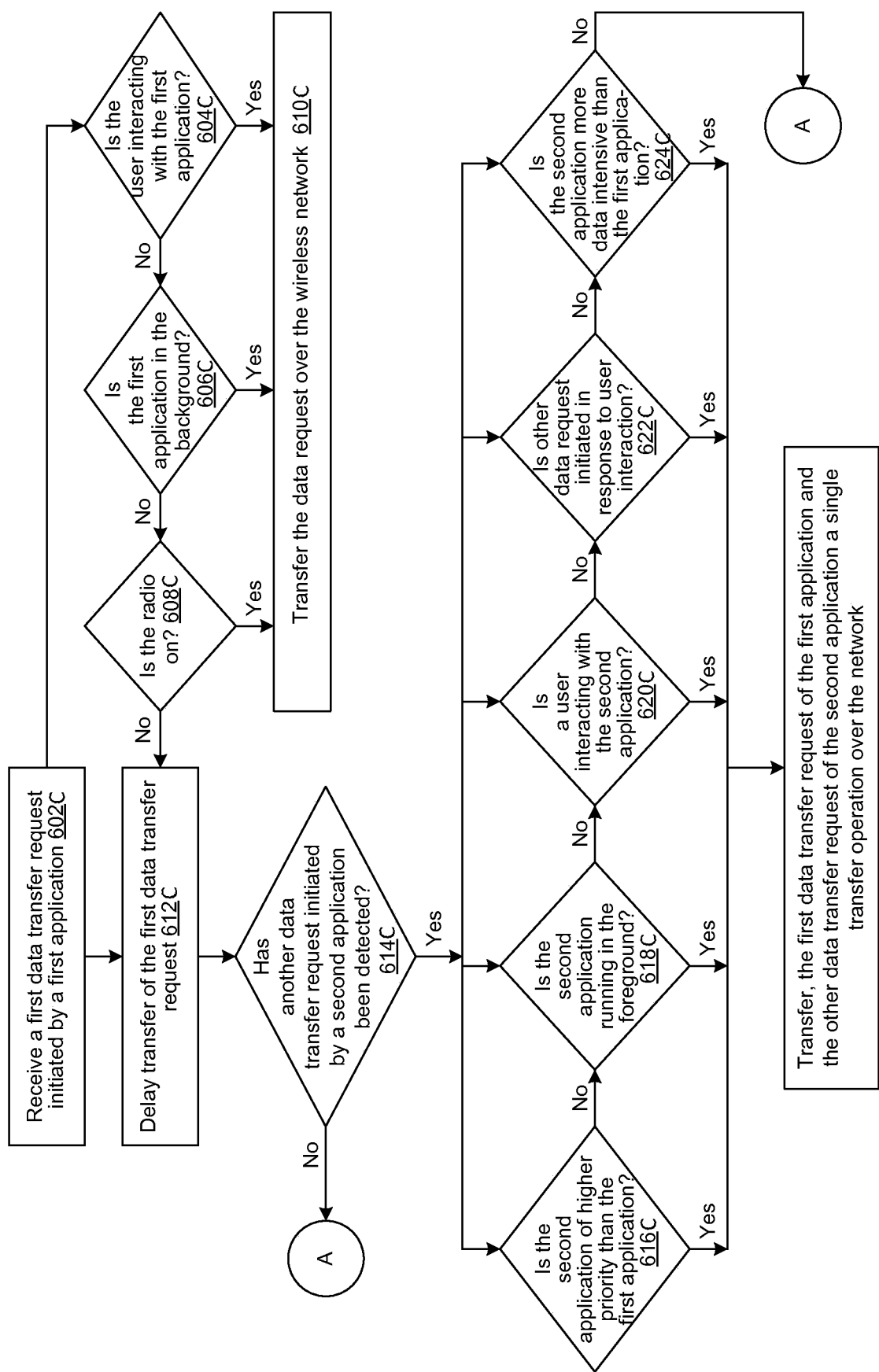
FIG. 6C depicts a flow chart illustrating example selection processes through which data transfer requests of multiple applications can be coordinated into a single transfer operation.

FIG. 6C depicts a flow chart illustrating example selection processes through which data transfer requests of multiple applications can be coordinated into a single transfer operation.

In process 602C, a first data transfer request initiated by a first application on a device or mobile device is received. One or more selection processes can be performed to determine whether to delay transfer of the first data transfer request, as shown in steps 604C-608C, including, determining whether the user is interacting with the first application, whether the first application is in the foreground, or whether the radio of the mobile device on which the request is initiated is already on. Note that although the selection processes are illustrated and identified in a specific order, the order in which the system checks for applicability is not limited to such, any of the above conditions can be checked in any ordering or any combination with one of the other conditions.

If one of the above applies, in process 610C, in general, a decision can be made to transfer the data request over the wireless (cellular or others) network, or to power on the radio (e.g., via the radio controller 256 shown in the example of FIG. 2A) to perform the transfer without or with minimal delay. Additional conditions that are not shown here which may cause the transfer of the data request to occur immediately or upon receipt may be included.

If none of the conditions in 604C-608C applies (or other suitable conditions depending on the specific implementation), in process 612C, the transfer of the first data transfer request can be delayed. In process 614C, it is determined whether another data transfer request has been initiated. If not, the process continues at flow 'A' in FIG. 7C.

If so, the system performs one or more of several condition checks shown in decision flows 616C-624C including determining whether the second application is of higher priority than the first application, whether the second application running in the foreground, whether the user interacting with the second application, whether the other data request initiated in response to user interaction, and/or whether the second application is more data intensive than the first application. The flow chart continues at 'A' in FIG. 7C if none of the above conditions apply.

If any of the above conditions apply, then in process 626C, the first data transfer request of the first application and the other data transfer request of the second application are transferred in a single transfer operation over the network. Note that the conditions shown in 616C-624C can be applied in any order or any combination with one another, although illustrated in the example flow chart as having a particular order.

Figure 7C:
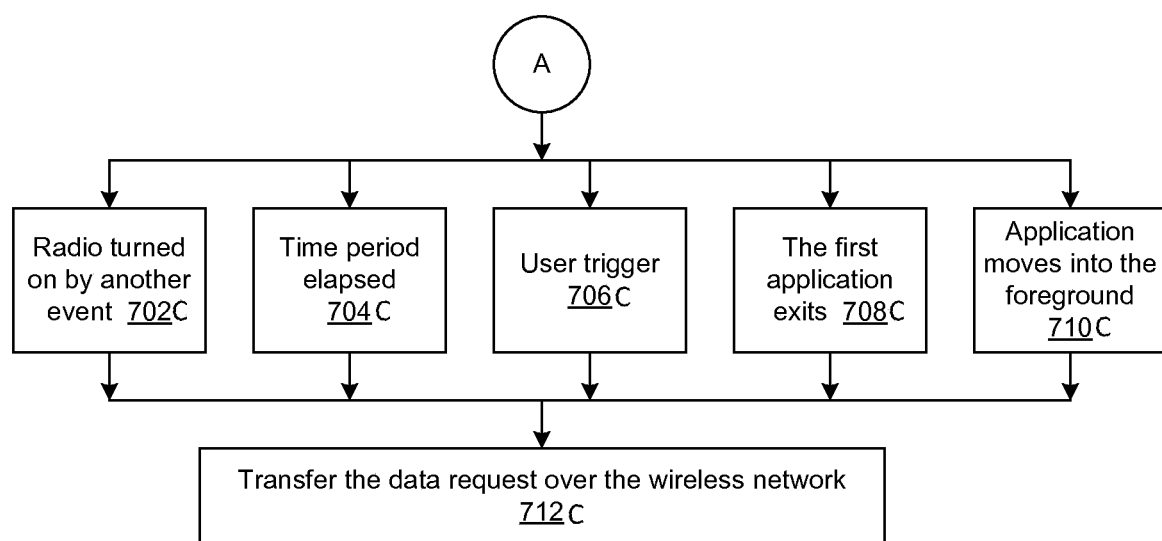
FIG. 7C depicts an example of triggering events that would cause a data request to be transferred without alignment with another data request.

FIG. 7C depicts an example of triggering events that would cause a data request to be transferred without alignment with another data request.

The events shown in processes 702C-710C can occur independently or in conjunction with one another and cause the data request to be transferred over the wireless network without or with minimal delay upon occurrences of these events. For example, in process 702C, the mobile device radio is turned on due to another event. In process 704C, a certain time period has elapsed, in process 706C, a user trigger is detected, and/or the first application exits in process 708C and/or moves into the background in process 710C. When any of the above conditions are detected, n process 721C, the data request is transferred over the wireless (cellular or others) network.

Figure 8C:
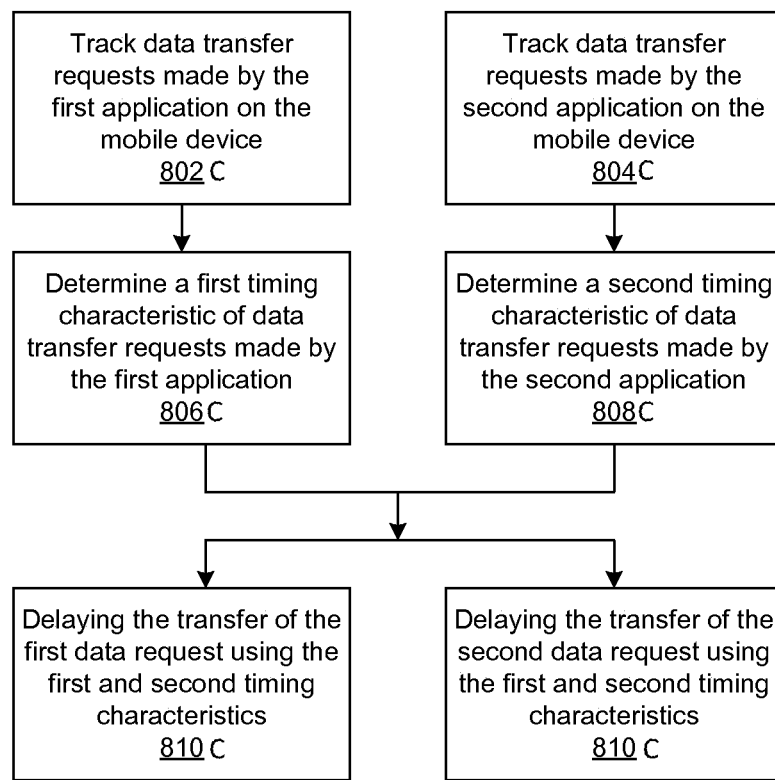
FIG. 8C depicts a flow chart illustrating an example process for using timing characteristics of data requests made by individual applications to delay transfer of one or more of the data requests made by one of the individual applications.

FIG. 8C depicts a flow chart illustrating an example process for using timing characteristics of data requests made by individual applications to delay transfer of one or more of the data requests made by one of the individual applications.

In processes 802C and 804C, data transfer requests made by first and second application on the mobile device are tracked. For example, the transaction/request manager 235 of the local proxy 275 shown in the example of FIG. 2A can detect the occurrence of the data transfer requests and request that the application behavior detector 236 begin to track correlations or other types of behaviors of the requesting applications.

In process 806C, a first timing characteristic of data transfer requests made by the first application is determined and in process 808C, a second timing characteristic of data transfer requests made by the second application is determined, and can be used, for example, by the correlation detector 238 to identify any correlations in the requests.

Based on the identified timing characteristics and any determined correlations or applicable priorities (e.g., as determined by the prioritization engine 238 in the example of FIG. 2A). In process 810C, the transfer of the first data request can be delayed using the first and second timing characteristics or in process 812C, the transfer of the second data request can be delayed using the first and second timing characteristics. Such delay (e.g., determined by the delay module 258 of the local proxy shown in the example of FIG. 2B) can be until another event occurs, until a manual (user) trigger is detected, or after a certain amount of time, or when another triggering event (e.g., user interaction) occurs. Note that the delays are user-configurable and can be tracked and factored into consideration by the delay module 258.

While the example is illustrated and described for different applications (e.g., first and second applications are different applications), the process can similarly be applied to different requests within the same application (e.g., first and second applications may be the same application).

Figure 9B:
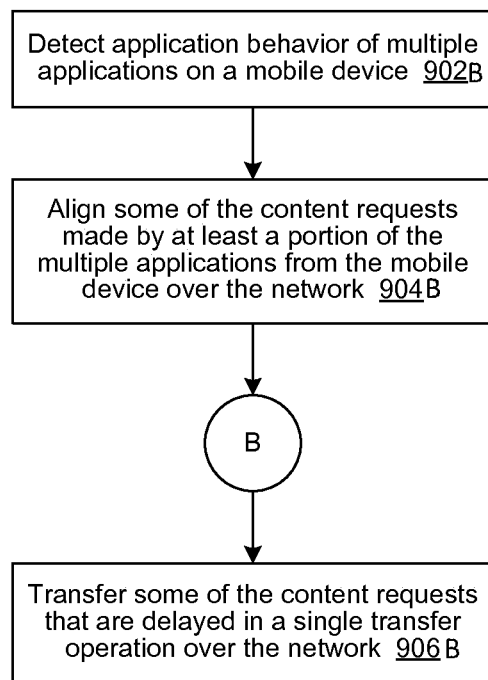
FIG. 9B depicts a flow chart illustrating an example process for using application behavior of multiple applications to align their content requests made over the network.

FIG. 9B depicts a flow chart illustrating an example process for using application behavior of multiple applications to align their content requests made over the network.

In process 902B, application behavior of multiple applications are detected on a mobile device. In general, the behaviors of any number of applications on the mobile device that are detected can be tracked. Any or all mobile applications on a device can be monitored for the potential for its requests to be aligned for traffic coordination. In addition, the user can select the applications to be aligned, or specify applications not to be tracked for traffic coordination. Furthermore, the device platform, manufacturer, OS settings, and/or network provider may have additional specifications or conditions for aligning traffic requests and selection of applications for traffic coordination.

Figure 10B:
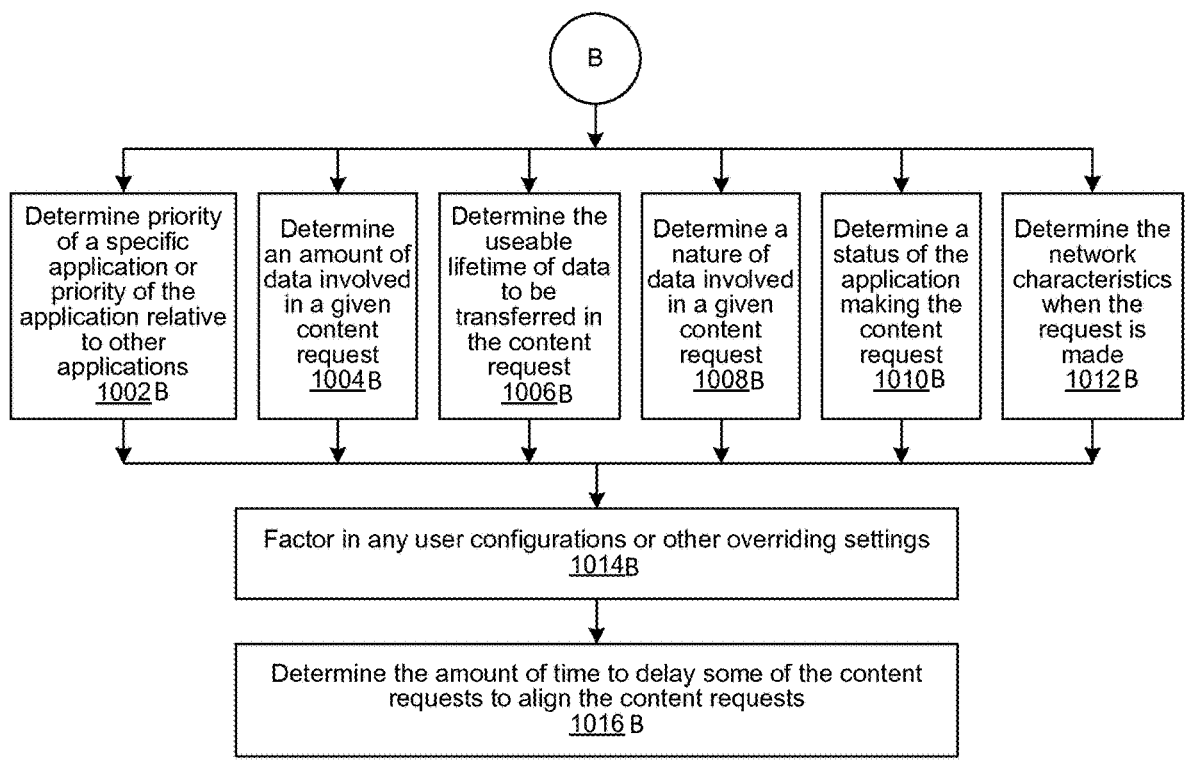
FIG. 10B depicts an example of processes through which the time of delay for content requests can be determined to align content requests over the wireless network.

In process 904B, some of the content requests made by at least a portion the multiple applications from the mobile device over the network, are aligned. Process flow continues to step 'B' as shown in the example of FIG. 10B which depicts an example of processes through which the time of delay 'D' for content requests can be determined to align content requests over the wireless network. In process 906B, some of the content requests that are delayed in a single transfer operation are transferred over the network.

Example processes applied to determine delay time 'D' include, by way of example but not limitation: Determine priority of a specific application or priority of the application relative to other applications in process 1002B, Determine an amount of data involved in a given content request in step 1004B, Determine the useable lifetime of data to be transferred in the content request in step 1006B, Determine a nature of data involved in a given content request in step 1008B, Determine a status of the application making the content request in step 1010B, and/or Determine the network characteristics when the request is made in step 1012B. Any number of the above conditions can be applied in any order. Additional conditions which can be used may not be illustrated in the example above. In process 1014B, any user configuration or overriding settings can be factored into consideration in determining delay to align content request, in process 1016B.

Figure 6D:
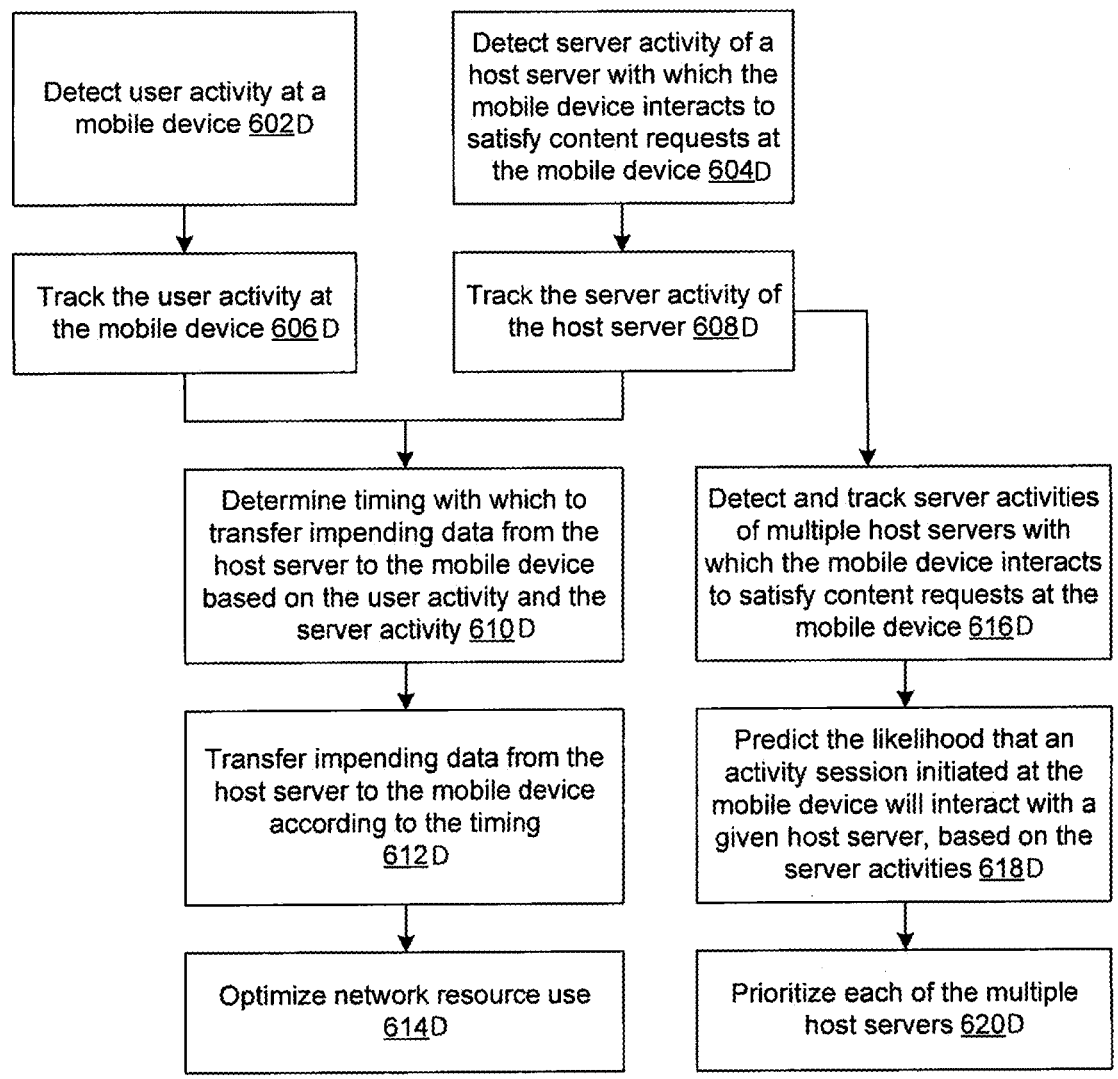
FIG. 6D depicts a flow chart illustrating an example process for using user activity and/or application server/provider activity to time the transfer of data from the host to the mobile device to optimize use of network resources.

FIG. 6D depicts a flow chart illustrating an example process for using user activity and/or application server/provider activity to time the transfer of data from the host to the mobile device to optimize use of network resources.

Figure 7D:
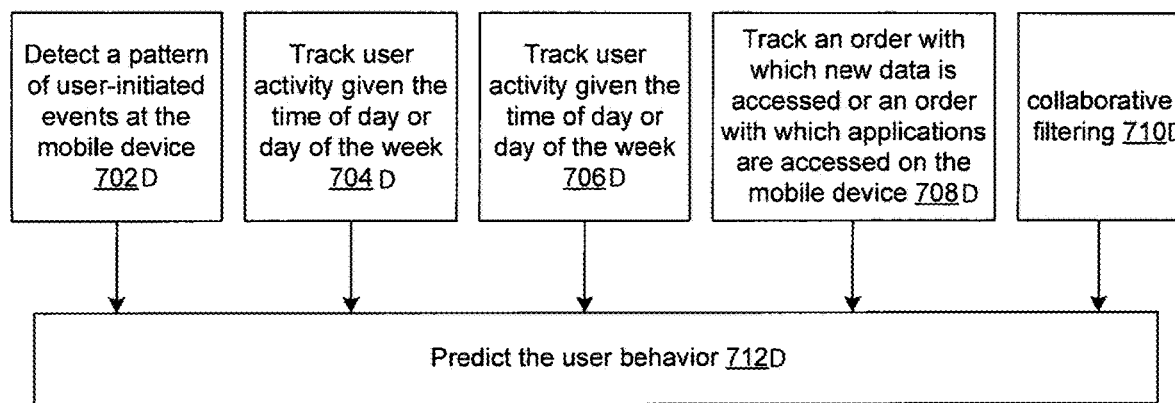
FIG. 7D depicts an example of processes which can be used for user behavior prediction.
Figure 8D:
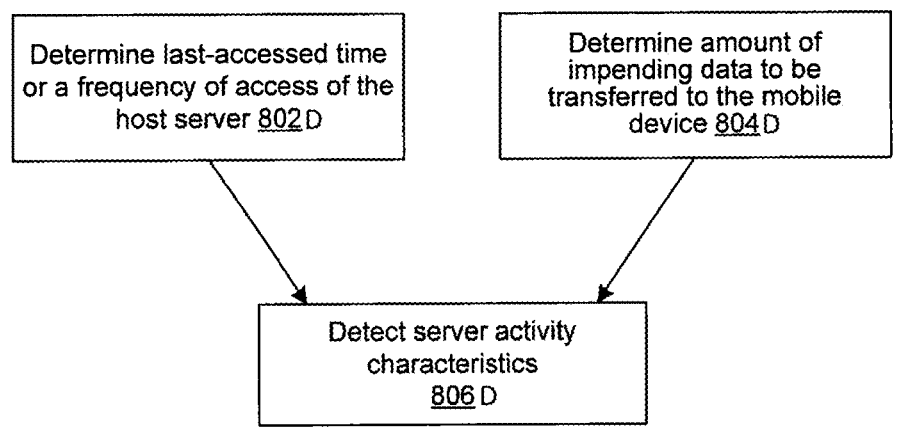
FIG. 8D depicts an example of processes which can be used to detect application server/content provider characteristics.

In process 602D, user activity at a mobile device is detected and tracked in process 606D. In process 604D, server activity is detected for a host server (e.g., an application server or content provider such as app server/provider 110 in the examples of FIGS. 1A-1B) with which the mobile device interacts to satisfy content requests at the mobile device. In process 608D, the server activity can be tracked. In one embodiment, the user behavior and activity are detected and tracked by a local proxy on the mobile device and the server activity of the host server (app server/content provider) is tracked and detected by a remote proxy which is able to wirelessly communicate with the local proxy in a distributed proxy system. Some examples of the types of user activities and server activities that can be tracked or characterized are shown in the examples of FIGS. 7D and 8D.

Using the user activity and/or the server activity, the timing with which to transfer impending data from the host server to the mobile device is determined. In one embodiment, the timing is determined based on prediction of a future activity session at the mobile device.

In process 610D and in process 612D, the impending data is transferred from the host server to the mobile device according to the timing. The timing is generally determined such that network resource use is optimized and/or such that user experience is enhanced or preserved. For example, the transferring of impending data comprises pre-caching of content on the mobile device to support data activity for a future activity session predicted based on the user behavior and the server activity.

In addition, server activities of multiple host servers (e.g., multiple application servers or content providers including by way of example but not limitation, push notification servers, email hosts, RSS, web services, web sites, gaming sites, etc.) with which the mobile device interacts to satisfy content requests at the mobile device are detected and/or tracked in process 616D. In process 618D, based on the server activities of multiple hosts and providers, the likelihood that an activity session initiated at the mobile device will interact with a given host server (application server or provider) can be predicted. Based on the prediction, each of the multiple host servers are prioritized based on the prediction of likelihood an activity session initiated at the mobile device will interact with a given host server, in process 620D.

FIG. 7D depicts an example of processes which can be used to for user behavior prediction.

For example, the system (either the local proxy on the device side or the server proxy on the server side, or a combination thereof) can detect a pattern of user-initiated events at the mobile device, in process 702D. For example, a pattern can include, a correlation in time between initiations of one application and another application, or correlation between initiation of one event/transaction and another event/transaction. The system can also track the user activity given the time of day or day of the week in process 704D, and identify any patterns in user behavior such as preferences or habits with regards to application use frequency, which applications are used, and/or which activities the user is engaged in with each application, The system can further track an order with which new data is accessed or an order with which applications are accessed on the mobile device, in process 708D, and/or through collaborative filtering, in process 710D. Any number of and combination of the above events can be used to predict user behavior, in step 712D.

Note that user behavior can be determined for different contexts. For example, the system can determine user behavior with respect to accessing work email and behavior with respect to accessing personal email accounts (e.g., time of day or day of week a user accesses certain accounts, frequency, actions taken, features used, etc.). In addition, user behavior may also be determined with respect to different applications or services (e.g., when and how frequently a user uses Facebook, tweets, accesses Yelp, uses Maps/Location/Direction applications, etc.)

FIG. 8D depicts an example of processes which can be used to detect app server/provider characteristics.

For example, the last last-accessed time or a frequency of access of the host server (application server/service provider) can be determined in process 802D, or an amount of impending data to be transferred to the mobile device can be determined in process 804D. In general, server activities can be detected and monitored by the server-side components (e.g., the proxy server) of the distributed proxy and cache system. Such information can be used alone or in conjunction to detect server activity characteristics, in process 806D.

Figure 9C:
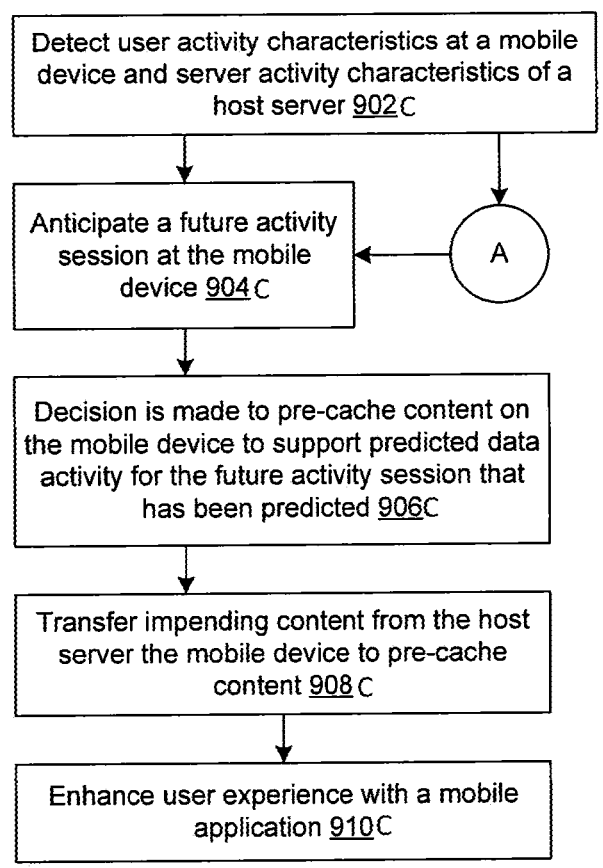
FIG. 9C depicts a flow chart illustrating an example process to anticipate a future activity session at a mobile device to enhance user experience with a mobile application.

FIG. 9C depicts a flow chart illustrating an example process to anticipate a future activity session at a mobile device to enhance user experience with a mobile application.

In process 902C, user activity characteristics at a mobile device and server activity characteristics of a host server are detected. The host server is a server with which the mobile device interacts with to satisfy application requests (e.g., mobile applications) at the mobile device and can include, for example, application servers or content providers.

In process 904C, a future activity session can be anticipated at the mobile device. In addition, contextual cues can be used in the anticipation of the activity session as illustrated at flow 'A' in the example of FIG. 10C.

In process 906C, decision is made to pre-cache content on the mobile device to support predicted data activity for the future activity session that has been predicted. In process 908C, impending content is transferred from the host server the mobile device to pre-cache content, such that user experience with the mobile application can be enhanced.

Figure 10C:
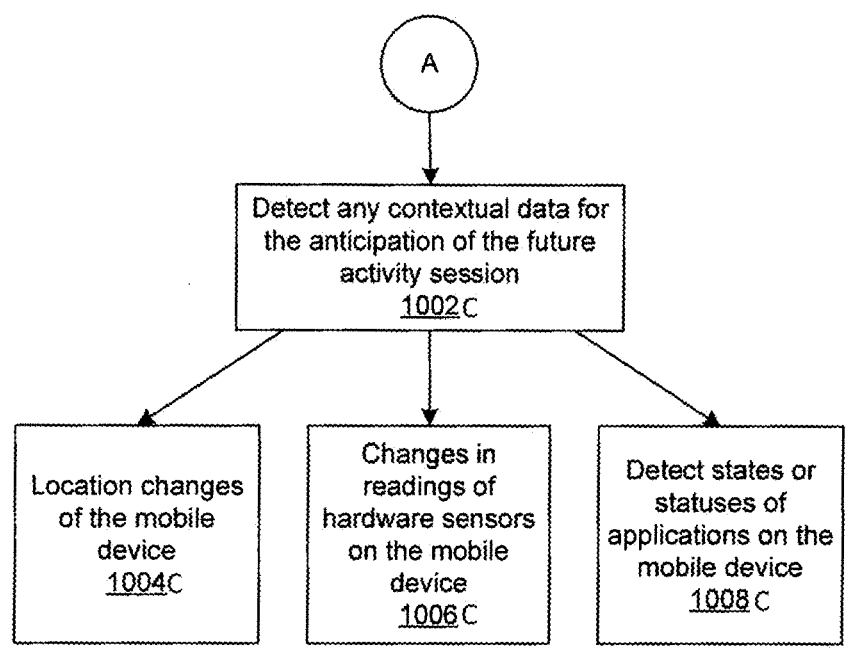
FIG. 10C depicts an example of processes through which contextual data for use in anticipation of future activity sessions can be determined.

FIG. 10C depicts an example of processes through which contextual data for use in anticipation of future activity sessions can be determined.

For example, location change of the mobile device can be detected, in step 1004C; changes in readings of hardware sensors (e.g., motion, GPS, temperature, tilt, vibration, capacitive, resistive, ambient light, device backlight, etc.) on the mobile device can be detected in 1006C, and/or states or statuses of applications (e.g., activity state, foreground/background status, etc.) on the mobile device can be detected in 1008C.

Figure 11:
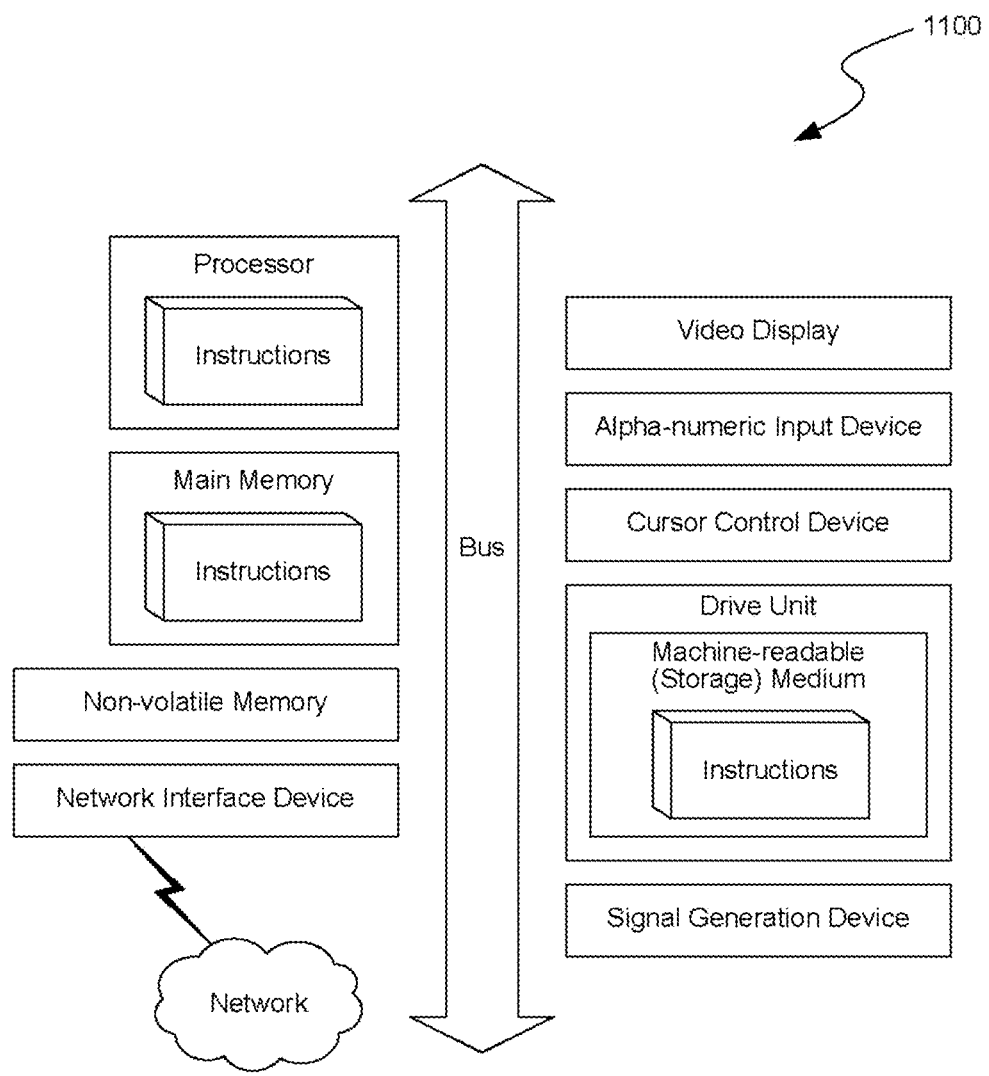
FIG. 11 shows a diagrammatic representation of a machine in the example form of a computer system within which a set of instructions, for causing the machine to perform any one or more of the methodologies discussed herein, may be executed.

FIG. 11 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some embodiments, the network interface device may enable the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

In some embodiments, the network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶16, other aspects may likewise be embodied as a means-plus-function claim, or in other forms, such as being embodied in a computer-readable medium. (Any claims intended to be treated under 35 U.S.C. § 112, ¶16 will begin with the words "means for".) Accordingly, the applicant reserves the right to add additional claims after filing the application to pursue such additional claim forms for other aspects of the disclosure.

The invention claimed is:

1. A mobile device which improves network resource utilization in a wireless network, the mobile device, comprising:
 a memory;
 a radio; and
 a processor coupled to the memory and configured to:
  receive instructions from a user to enter a power save mode;
  while in the power save mode, block transmission of outgoing application data requests, wherein the outgoing application data requests are background application requests for a first application and a second application;
  while in the power save mode, allow transmission of additional outgoing application data requests in response to occurrence of receipt of data transfer from a remote entity while blocking transmission of outgoing application data requests for the first application and the second application, user input in response to a prompt displayed to the user, and a change in a background status of an application executing on the mobile device, wherein the additional outgoing application data requests are foreground application requests,
  wherein the remote entity is an intermediary server that provides connectivity between a first application server for the first application and the mobile device, and between a second application server for the second application and the mobile device, wherein the connectivity between the remote server and the mobile device is over a multiplexed connection;
  wherein the data transfer is a notification of new data for the first application at the first application server,
  wherein connectivity between the remote entity and the mobile device is maintained by transmission of keep-alive messages over the multiplexed connection,
  wherein, the multiplexed connection is maintained while the outgoing application data requests for the first application and the second application are blocked; and
  exit the power save mode based on received instructions from the user to exit the power save mode,
  wherein, when the power save mode is exited, the outgoing application data requests occurring while the mobile device is not in the power save mode are blocked by user selection on an application-by-application basis, wherein the user selection instructs the mobile device whether to block the outgoing application data requests for each application that is selected by the user for blocking.

2. The mobile device of claim 1, wherein the data transfer is a notification of new data at one of the first application server and second application server.

3. The mobile device of claim 1, wherein entry into the power save mode is further based on battery level.

4. The mobile device of claim 1, wherein the processor is configured to receive data in response to the allowed additional outgoing application data requests.

5. The mobile device of claim 1, wherein the processor is configured to receive data directed towards applications having blocked outgoing application data requests while the applications are not allowed transmission of the additional application data requests.

6. The mobile device of claim 1, wherein the processor is configured to receive data directed towards applications having blocked outgoing application data requests after the applications are allowed transmission of additional application data requests.

7. The mobile device of claim 1, wherein the outgoing application data requests and the additional application data requests are for a same application.

* * * * *